(12) United States Patent
Otomo et al.

(10) Patent No.: US 7,500,725 B2
(45) Date of Patent: Mar. 10, 2009

(54) HYDRAULIC BRAKING PRESSURE CONTROL UNIT

(75) Inventors: Akihiro Otomo, Toyota (JP); Kiyoharu Nakamura, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/715,980

(22) Filed: Mar. 9, 2007

(65) Prior Publication Data

US 2007/0159002 A1 Jul. 12, 2007

Related U.S. Application Data

(62) Division of application No. 10/117,035, filed on Apr. 8, 2002, now Pat. No. 7,204,566.

(30) Foreign Application Priority Data

Apr. 17, 2001 (JP) ............................. 2001-117913
May 25, 2001 (JP) ............................. 2001-156449

(51) Int. Cl.
   *B60T 8/36* (2006.01)
(52) U.S. Cl. ............................. 303/119.3; 303/DIG. 10
(58) Field of Classification Search ............. 303/119.3, 303/DIG. 10; 137/884
   See application file for complete search history.

(56) References Cited

U.S. PATENT DOCUMENTS

| 5,474,108 | A | 12/1995 | Inden et al. |
| 5,577,813 | A | 11/1996 | Zaviska |
| 5,593,216 | A | 1/1997 | Hosoya et al. |
| 5,620,028 | A | 4/1997 | Johnston et al. |
| 5,866,822 | A | 2/1999 | Willig |
| 6,102,495 | A | 8/2000 | Zaviska |
| 6,126,244 | A | 10/2000 | Fries |
| 6,142,751 | A * | 11/2000 | Krauter et al. ............ 303/116.4 |
| 6,186,603 | B1 | 2/2001 | Park |
| 6,234,199 | B1 * | 5/2001 | Nohira ................... 303/119.3 |
| 6,270,170 | B1 | 8/2001 | Isogai et al. |
| 6,309,032 | B1 | 10/2001 | Kusano et al. |
| 6,398,315 | B1 * | 6/2002 | Dinkel et al. ............ 303/119.3 |
| 6,439,673 | B2 | 8/2002 | Anderson |
| 6,450,591 | B1 | 9/2002 | Kawahata et al. |

FOREIGN PATENT DOCUMENTS

| DE | 03 545 021 A1 | 6/1987 |
| DE | 197 09 778 A1 | 9/1998 |

(Continued)

*Primary Examiner*—Thomas J Williams
(74) *Attorney, Agent, or Firm*—Oliff & Berridge, PLC

(57) ABSTRACT

A hydraulic braking pressure control unit including three or more hydraulic pressure control components, and a holder structure which holds those hydraulic pressure control components, wherein the three or more hydraulic pressure control components are selected from electromagnetically operated hydraulic pressure control valves capable of controlling a pressure of a working fluid in a brake cylinder in a braking system, and pressure detecting devices, to detect respective pressures of the fluid used to control the electromagnetically operated hydraulic pressure control valves. The three or more hydraulic pressure control components include three hydraulic pressure control components which are attached to the holder structure such that one of the three hydraulic pressure control components is spaced from the other two hydraulic pressure control components by substantially the same distance.

5 Claims, 16 Drawing Sheets

FOREIGN PATENT DOCUMENTS

| | | |
|---|---|---|
| DE | 199 59 670 | 6/2000 |
| EP | 0 887 242 A1 | 12/1998 |
| JP | A-02-216354 | 8/1990 |
| JP | A-06-001227 | 1/1994 |
| JP | A-07-047944 | 2/1995 |
| JP | A-08-080827 | 3/1996 |
| JP | A-09-099824 | 4/1997 |
| JP | A-10-086804 | 4/1998 |
| JP | A-10-250568 | 9/1998 |
| JP | A-10-258724 | 9/1998 |
| JP | A-11-152025 | 6/1999 |
| JP | A-11-304076 | 11/1999 |
| JP | A-2000-127935 | 5/2000 |
| JP | A-2000-177560 | 6/2000 |
| JP | A-2000-203405 | 7/2000 |
| JP | A-2001-122105 | 5/2001 |
| WO | WO 9925594 A1 * | 5/1999 |
| WO | WO 99/30943 | 6/1999 |
| WO | WO 00/02755 | 1/2000 |
| WO | WO 00/30909 | 6/2000 |

* cited by examiner

HYDRAULIC BRAKING PRESSURE CONTROL UNIT

CROSS-REFERENCE TO RELATED APPLICATIONS

This application is a divisional application of application Ser. No. 10/117,035, filed Apr. 8, 2002, which is based on Japanese Patent Applications Nos. 2001-117913, filed on Apr. 17, 2001, and 2001-156449, filed May 25, 2001. The disclosures of the priority applications are hereby incorporated by reference herein.

BACKGROUND

The present invention relates to a hydraulic braking pressure control unit.

There is known a hydraulic braking pressure control unit which includes a plurality of electromagnetically operated hydraulic pressure control valves capable of controlling brake cylinders, and hydraulic pressure detecting devices. The hydraulic pressure control valves and the hydraulic pressure detecting devices are held by a holder structure.

U.S. Pat. No. 5,577,813 (corresponding to JP-A-8-502007) discloses an example of such a hydraulic braking pressure control unit, which includes: (i) a power operated hydraulic pressure source having (a) a pump device including a pump arranged to pressurize a working fluid received from a low pressure source and deliver the pressurized working fluid, and a motor operable to drive the pump, and (b) an accumulator arranged to store the working fluid delivered from the pump device, (ii) a control valve device including at least one control valve each capable of controlling a hydraulic braking pressure in a brake cylinder for operating a brake, by utilizing the fluid delivered from the power operated hydraulic pressure source, and (iii) a holder structure which has a first surface and a second surface opposite to each other, and a third surface adjacent to the first and second surfaces. The holder structure include first, second and third portions respectively having the first, second and third surfaces. The holder structure holds the power operated hydraulic pressure source and the control valve device such that each of the above-indicated at least one control valve is attached at its main body portion to the first portion, and the motor is attached at its main body portion to the second portion, while the accumulator is attached at its main body portion to the third portion.

SUMMARY

It is an object of the present invention to provide a hydraulic braking pressure control unit which is arranged to be relatively small-sized. This object may be achieved according to any one of the following modes of the present invention in the form of a hydraulic braking pressure control unit, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A hydraulic braking pressure control unit comprising:

at least three hydraulic pressure control components selected from (i) electromagnetically operated hydraulic pressure control valves capable of controlling a pressure of a working fluid in a brake cylinder in a braking system, and (ii) pressure detecting devices used to detect respective pressures of the fluid, to control the electromagnetically operated hydraulic pressure control valves; and a holder structure which holds the at least three hydraulic pressure control components, and wherein the at least three hydraulic pressure control components include three hydraulic pressure control components which are attached to the holder structure such that one of the three hydraulic pressure control components is spaced from the other two of the three hydraulic pressure control components by a substantially same distance.

In the hydraulic braking pressure control unit constructed according to the above mode (1) of the present invention, the three hydraulic pressure control components are located at respective three apexes of an isosceles triangle. In other words, one of the three components is located on a straight line which is normal to a segment connecting the centers of the other two components and which passes a midpoint of that segment. Where the hydraulic braking pressure control units include a relatively large number of hydraulic pressure control components that include two or more sets of three components wherein the three components of each set are positioned relative to each other as described above, the components are arranged in a zigzag or staggered pattern on the holder structure, so that the number of the components that can be attached per unit surface area of the holder structure can be made larger, than where the components are arranged in a rectangular lattice pattern. Accordingly, the present arrangement permits an increased density of arrangement of the hydraulic pressure control components, and effective utilization of the surface area of the holder structure, thereby making it possible to reduce the required size of the hydraulic braking pressure control unit. Thus, the present arrangement is advantageous where the unit includes a relatively large number of hydraulic pressure control components.

The three hydraulic pressure control components located at the respective apexes of an isosceles triangle may be of the same kind, or one of the three components is different in kind from the other two components. For instance, the three components are all electromagnetically operated hydraulic pressure control valves, or pressure detecting devices. Alternatively the two components are electromagnetically operated hydraulic pressure control components while the third component is a pressure detecting device, or the two components are pressure detecting devices while the third component is a hydraulic pressure control valve. Described more specifically, a pressure detecting device may be spaced from two hydraulic pressure control valves by the same distance, or a hydraulic pressure control valve may be spaced from two pressure detecting devices by the same distance. Further alternatively, either a hydraulic pressure control valve or a pressure detecting device may be spaced from a hydraulic pressure control valve and a pressure detecting device by the same distance.

Each pressure detecting devices is provided to detect a pressure of the fluid, which pressure is used to control the electromagnetically operated hydraulic pressure control valves. For instance, the pressure detecting device may be a brake cylinder pressure detecting device used to detect the hydraulic braking pressure in the brake cylinder, a power operated pressure source pressure detecting device used to detect the pressure of a pressurized fluid delivered from a power operated hydraulic pressure source, or a master cylinder pressure detecting device used to detect the pressure of a pressurized fluid delivered from a master cylinder. Where the hydraulic braking pressure in the brake cylinder is controlled on the basis of the pressure of the pressurized fluid delivered from the power operated hydraulic pressure source, the electromagnetically operated hydraulic pressure control device is controlled on the basis of the pressure of the pressurized fluid received from the power operated hydraulic pressure source. Where the hydraulic braking pressure in the brake cylinder is controlled so as to be equal to a target or desired value determined on the basis of the pressure of the pressurized fluid delivered from the master cylinder, the hydraulic pressure control valve is controlled on the basis of the fluid pressure of the master cylinder.

The electromagnetically operated hydraulic pressure control valves may include not only control valves arranged to directly increase or reduce the hydraulic braking pressure in the brake cylinder, but also electromagnetically operated valves arranged to isolate the brake cylinder from the master cylinder when the hydraulic braking pressure in the brake cylinder is controlled by utilizing the pressurized fluid delivered from the power operated hydraulic pressure source.

The principle of the present invention according to the above mode (1) requires at least three hydraulic pressure control components of the hydraulic braking pressure control unit to include three components that are attached to the holder structure such that these three components are positioned relative to each other as described above. However, the principle of the present invention does not require all of the hydraulic pressure control components of the unit to satisfy the positional relationship as described above.

The hydraulic braking pressure control unit according to the above mode (1) may include the technical feature according to any one of the following modes (28), (32), (33), (36), (38), (40) and (41).

(2) A hydraulic braking pressure control unit according to the above mode (1), wherein the holder structure includes a portion having one surface, and the above-indicated at least three hydraulic pressure control components are attached to the holder structure such that a main body portion of each of the at least three hydraulic pressure control components is fixed to the above-indicated portion of the holder structure.

In the braking hydraulic pressure control unit according to the above mode (2), each hydraulic pressure control component is fixed to a portion of the holder structure on the side of one surface of the holder structure, so that the signal wires or lines connected to the components can be relatively easily bundled together.

Where the component is at its main body portion fixed to a portion of the holder structure o the side of one surface of the holder structure, it is common that a part of the main body portion is received in a recess open in that one surface of the holder structure while the other part of the main body portion projects from the surface. The part received in the recess may be larger than the other part projecting from the surface, or vice versa. In either case, the recess may function as a portion of the electromagnetically operated hydraulic pressure control valve or pressure detecting device. Where the recess formed in the holder structure functions as a portion of the electromagnetically operated hydraulic pressure control valve, for example, the hydraulic pressure control valve is constituted by a part of the holder structure defining the recess, and the main body portion fixed to the holder structure. Where the recess of the holder structure does not function as a portion of the electromagnetically operated hydraulic pressure control valve, that is, where the main body portion is capable of functioning as the hydraulic pressure control valve before the main body portion is fixed to the holder structure, only the main body portion is considered to function as the hydraulic pressure control valve. Where the recess of the holder structure function as a portion of the hydraulic pressure control valve, the recess may partially define a fluid chamber or communication passage that is required to be formed in the hydraulic pressure control valve.

(3) A hydraulic braking pressure control unit according to the above mode (1) or (2), wherein the above-indicated at least three hydraulic pressure control components include two components which are arranged along a reference line, and another component which is spaced from the reference line in a direction perpendicular to the reference line.

The reference line may be parallel to an X-axis or Y-axis direction of a surface of the holder structure (a direction of short or long sides of a rectangular surface of the holder structure, or a longitudinal or transverse direction of the rectangular surface). Where the two or more hydraulic pressure control components are arranged along the reference line while another hydraulic pressure component is located at a distance from the reference line, the surface area available on the holder structure can be effectively utilized for attachment of the components, with a reduced wasting of the surface area, if the above-indicted another component is spaced from the adjacent two components by the same distance. This arrangement permits significant reduction of the required size of the braking hydraulic pressure control unit.

(4) A hydraulic braking pressure control unit comprising (a) a plurality of electromagnetically operated hydraulic pressure control valves capable of controlling a pressure of a working fluid in a brake cylinder, and (b) a holder structure which holds the plurality of electromagnetically operated hydraulic pressure control valves, and wherein the plurality of electromagnetically hydraulic pressure control valves have respective main body portions which are arranged along a straight line on one surface of the holder structure, and the holder structure has at least one fluid passage which is formed in the holder structure such that each fluid passage extends in a direction intersecting the straight line, between two adjacent ones of the electromagnetically operated hydraulic pressure control valves as seen in a plane of the above-indicated one surface.

In the hydraulic braking pressure control unit according to the above mode (4) of this invention, each fluid passage is formed in the holder structure, by utilizing portions of the holder structure not occupied by the hydraulic pressure control valves, so that the required size of the hydraulic braking pressure control unit can be reduced. The above-indicated at least one fluid passage may include a high pressure passage connected to a high pressure source, and a low pressure passage connected to a low pressure source.

The hydraulic braking pressure control unit according to the above mode (4) may include the technical feature according to any one of the above modes (1)-(3). For instance, pressure detecting devices as well as the hydraulic pressure control valves may be arranged along the straight line. The fluid passage or passages may be formed according to the above mode (4), in the holder structure of the hydraulic braking pressure control unit according to any one of the above modes (1)-(3).

Further, the hydraulic braking pressure control unit according to the above mode (4) may include the technical feature according to any one of the following modes (28), (32), (33), (36), (38), (40) and (41).

(5) A hydraulic braking pressure control unit according to the above mode (4), wherein the above-indicated at least one fluid passage includes at least one high pressure passage connected to a high pressure source.

(6) A hydraulic braking pressure control unit according to the above mode (4) or (5), wherein the above-indicted at least one fluid passage includes at least one passage formed so as to extend in a direction substantially perpendicular to the straight line as seen in said plane.

Where the at least one fluid passage is formed so as to extend substantially perpendicularly to the straight line, the fluid passage or passages may be effectively formed in the holder structure, without increasing the size of the holder structure.

(7) A hydraulic braking pressure control unit according to any one of the above modes (4)-(6), wherein the above-indicated at least one fluid passage includes at least one passage formed so as to extend along a straight line which is normal to a segment connecting the centers of the adjacent ones of the plurality of electromagnetically operated hydraulic pressure control valves and which passes a midpoint of the segment, as seen in the plane of the above-indicated one surface.

(8) A hydraulic braking pressure control unit according to any one of the above modes (5)-(7), wherein the plurality of electromagnetically operated hydraulic pressure control valves whose main body portions are arranged along the straight line consist of four control valves, and the high pressure source includes a power operated hydraulic pressure source power-operable to pressurize the working fluid, and a master cylinder operable by an operator by the unit, the above-indicated at least one fluid passage including a pressure source passage connected to the power operated hydraulic pressure source, and at least one master cylinder passage connected to the master cylinder, each of the pressure source passage and the maser-cylinder passage being formed in the holder structure, so as to extend in the direction intersecting the straight line, between adjacent ones of the four control valves, as seen in the above-indicated plane.

In the hydraulic braking pressure control unit according to the above mode (8), one pressure source passage and two master cylinder passages may be formed between respective three pairs of adjacent control valves of the four control valves, for example.

(9) A hydraulic braking pressure control unit according to any one of the above modes (4)-(8), which is used for a braking system having two mutually independent sub-systems.

Where the braking system is used for an automotive vehicle, the braking system may be of an independent front-rear piping arrangement or an independent X-crossing piping arrangement. Namely, the two mutually independent sub-systems may consist of a front-wheel braking sub-system for braking the vehicle front wheels and a rear-wheel braking sub-system for braking the vehicle rear wheels, or alternatively, a first diagonal braking sub-system for braking the front left wheel and the rear right wheel, and a second diagonal braking sub-system for braking the front right wheel and the rear left wheel.

The technical feature according to the above mode (9) is applicable to the hydraulic braking pressure control unit according to any one of the above modes (1)-(3).

(10) A hydraulic braking pressure control unit according to the above mode (9), wherein the plurality of electromagnetically operated hydraulic pressure control valves consist of four control valves consisting of a first pair of control valves which are included in one of the two mutually independent sub-systems and which are arranged adjacent to each other, and a second pair of control valves which are included in the other of the two mutually independent sub-systems and which are arranged adjacent to each other such that one of the second pair of control valves is adjacent to one of the first pair of control valves.

The technical feature according to the above mode (10) is applicable to a hydraulic braking pressure control unit in which a plurality of pressure detecting devices, rather than the electromagnetically operated hydraulic pressure control valves, are arranged as hydraulic pressure control components, along a straight line on one surface of the holder structure.

(11) A hydraulic braking pressure control unit according to the above mode (9) or (10), wherein the four control valves consist of a first pair of control valves and a second pair of control valves which are disposed on respective opposite sides of a straight line which is normal to a segment connecting centers of inner two control valves of the four control valves and which passes a midpoint of the segment, as seen in a plane of the above-indicated one surface of the holder structure, the first and second pairs of control valves being respectively included the two mutually independent sub-systems.

(12) A hydraulic braking pressure control unit according to any one of the above modes (9)-(11), wherein the above-indicated one surface of the holder structure is bisected into two areas by a bisector line which is perpendicular to the straight line, the electromagnetically operated hydraulic pressure control valves consisting of a first group of control valves and a second group of control valves which are respectively included in the two mutually independent sub-systems.

(13) A hydraulic braking pressure control unit according to any one of the above modes (9)-(12), wherein the holder structure consists of two halves which are located on respective opposite sides of a bisector plane which includes a bisector line perpendicular to the straight line and which is perpendicular to the above-indicated one surface, the bisector line being located at a substantially central position on the above-indicated one surface as seen in a direction of the straight line, the holder structure having at least one first fluid passage and at least one second fluid passage which are respectively formed in the two halves of the holder structure.

Each fluid passage is preferably formed so as to extend in a direction parallel to or perpendicular to the bisector line.

(14) A hydraulic braking pressure control unit according to any one of the above modes (8)-(13), wherein the pressure source passage is formed between two inner control valves of the four control valves, as seen in the above-indicated plane.

Where the four control valves consist of two pairs of control valves which are included in the respective two mutually independent sub-systems, the pressurized fluid delivered from the power operated hydraulic pressure source can be equally utilized by the two sub-systems, where the pressure source passage is formed between the two pairs of control valves. The pressure source passage may be formed so as to extend along the bisector line, as seen in the plane of the above-indicated one surface of the holder surface.

(15) A hydraulic braking pressure control unit according to any one of the above modes (8)-(14), wherein the above-indicated at least one master cylinder passage consists of two master cylinder passages each of which is formed so as to extend between two adjacent ones of the electromagnetically operated hydraulic pressure control valves, as seen in the plane, the adjacent ones being included in a corresponding one of the two mutually independent two sub-systems.

Where the master cylinder has two pressurizing chambers, the fluid pressurized in one of the two pressurizing chambers is supplied to one of the two sub-systems, while the fluid pressurized in the other pressurizing chamber is supplied to the other sub-system.

(16) A hydraulic braking pressure control unit according to any one of the above modes (8)-(15), wherein the plurality of electromagnetically operated pressure control valves includes a master cylinder cut-off valve attached to the one surface, in communication with a portion of each of the at least one master cylinder passage, which portion is located on one of opposite sides of the straight line, the master cylinder cut-off valve being operable to selectively open and close the each master cylinder passage, the unit further including a master cylinder pressure detecting device attached to the one surface, in communication with another portion of the each master cylinder passage, which another portion is located on the other of the opposite sides of the straight line, the master cylinder pressure detecting device being operable to detect a pressure of the working fluid in the each master cylinder passage.

Where the holder structure holds the master cylinder cut-off valve and the master cylinder pressure detecting device as well s the control valves, the function to be performed by the unit is improved. Further, where the master cylinder cut-off valve and the master cylinder pressure detecting device are disposed on the respective opposite sides of the above-indicated straight line, the required size of the unit can be made smaller than where the cut-off valve and the pressure detecting device are disposed on one side of the straight line.

(17) A hydraulic braking pressure control unit according to the above mode (16), wherein the portion of the each master cylinder passage located on the one of the opposite sides of the straight line is connected to the master cylinder.

(18) A hydraulic braking pressure control unit according to any one of the above modes (4)-(17), wherein the holder structure has a plurality of fluid passages formed in parallel to each other.

The fluid passages may include the above-indicated pressure source passage and master cylinder passage or passages, and at least one brake cylinder passage connected to at least one brake cylinder. The parallel arrangement of these fluid passages permits effective utilization of the volume of the holder structure. The fluid passages may have the same depth or different depths from the above-indicated one surface of the holder structure. The volume of the holder structure can be utilized more effectively where the fluid passages are formed with different depth values. The fluid passages are preferably formed so as to extend in a direction perpendicular to the straight line along which the hydraulic pressure control valves are arranged.

(19) A hydraulic braking pressure control unit according to any one of the above modes (5)-(18), wherein the above-indicated at least one at least one high pressure passage consists of a plurality of high pressure passages, and the holder structure has four brake cylinder ports connected to respective four brake cylinders, and a plurality of high pressure ports connected to the plurality of high pressure passages, the four brake cylinder ports and the plurality of high pressure ports being arranged in a zigzag pattern, along respective two straight lines which are spaced apart from each other, such that the brake cylinder ports and the high pressure ports are alternately arranged in a direction parallel to the two straight lines.

The brake cylinder ports and the high pressure ports may be formed in a surface of the holder structure which is perpendicular to the direction of extension of the fluid passages, for example. The brake cylinder ports and high pressure ports are connected through joints to pipes, hoses or other connecting members, which are in turn connected to the brake cylinders or the high pressure source. Accordingly, spaces for attachment and manipulation of the joints are required to be provided around the ports. Where the brake cylinder ports and high pressure ports are all arranged along a single straight line, the surface of the holder structure in which those ports are formed is required to have a relatively large length along the straight line. Where those ports are arranged along the respective two straight lines, in a zigzag or staggered pattern, an increase of the required length of the surface can be avoided. The zigzag arrangement of the brake cylinder ports and the high pressure ports requires that the fluid passages communicating with the brake cylinder ports and the fluid passages communicating with the high pressure ports be formed at different positions in a direction perpendicular to the above-indicated one surface on which the hydraulic pressure control valves are arranged.

(20) A hydraulic braking pressure control unit according to any one of the above modes (1)-(19), wherein the holder structure includes a portion having one surface, and has a plurality of brake cylinder passages formed for connection to respective brake cylinders, and at least one connecting passage each formed for communication between two passages of the plurality of brake cylinder passages, the electromagnetically operated hydraulic pressure control valves including at least one communication control valve attached to the above-indicated portion of the holder structure, the above-indicated at least one communication control valve being provided for the at least one connecting passage and operable to selectively open and close a corresponding one of the at least one connecting passage.

Where the holder structure of the hydraulic braking pressure control unit holds the communication control valve or valves, the function of the unit is accordingly improved. It is desirable to form the plurality of brake cylinder passages in parallel with each other, and form each connecting passage so as to extend in a direction perpendicular to the brake cylinder passages.

(21) A hydraulic braking pressure control unit including (a) a pressure increasing control valve operable to increase a pressure of a working fluid in a brake cylinder, by effecting communication of said brake cylinder with a high pressure source, (b) a pressure reducing control valve operable to reduce the pressure of the working fluid in the brake cylinder, by effecting communication of the brake cylinder with a low pressure source, (c) a brake cylinder pressure detecting device operable to detect the pressure in the brake cylinder, and (d) a holder structure which holds the pressure increasing and pressure reducing control valves and the brake cylinder pressure detecting device, and wherein the holder structure includes a portion having one surface, and the pressure increasing control valve, the pressure reducing control valve and the brake cylinder pressure detecting device are attached to the above-indicated portion of the holder structure such that the pressure reducing and pressure reducing control valves and the brake cylinder pressure detecting device are arranged along a substantially straight line on the above-indicated one surface, and such that the brake cylinder pressure detecting devices is located at a substantially midpoint between the pressure increasing and pressure reducing control valves.

Where the brake cylinder pressure detecting device is attached to the holder structure such that the brake cylinder pressure detecting device is located at a substantially midpoint between the pressure increasing and pressure reducing control valves, changes of the fluid pressure by the operations of the pressure increasing and pressure reducing control valves can be equally detected by the pressure detecting device. Accordingly, this arrangement is effective to reduce inconsistency between the pressure increase control and the pressure decrease control by those two control valves, making it possible to improve the accuracy of control of the hydraulic braking pressure in the brake cylinder.

Where the holder structure holds a plurality of sets of pressure increasing and pressure reducing control valves and brake cylinder pressure detecting devices, it is desirable to arrange the control valves and pressure detecting devices such that a plurality of straight rows each consisting of the pressure increasing and pressure reducing control valves and brake cylinder pressure detecting device are parallel to each other. That is, the two or more sets of control valves and pressure detecting devices are desirably arranged in a rectangular lattice pattern. Although the control valves and the pressure detecting devices may be arranged in a zigzag or staggered pattern, pressure increasing and pressure reducing brake cylinder passages may be more conveniently formed commonly for the pressure increasing and pressure reducing control valves, where the control valves and pressure detecting devices are arranged in the rectangular lattice pattern, than where they are arranged in the zigzag pattern. This aspect will be described in detail in the DETAILED DESCRIPTION OF THE PREFERRED EMBODIMENTS.

The hydraulic braking pressure control unit according to the above mode (21) may include the technical features according to any one of the above modes (1)-(20). Where the unit according to the mode (21) includes the technical feature according to the mode (4), for example, the straight line described with respect to the mode (4) intersects the straight line described with respect to the mode (21), preferably at right angles.

The hydraulic braking pressure control unit according to the above mode (21) may further include the technical feature according to any one of the following modes (28), (32), (33), (36), (38), (40) and (41).

(22) A hydraulic braking pressure control unit according to the above mode (21), wherein the holder structure has a pressure increasing brake cylinder passage connecting the brake cylinder pressure detecting device and the pressure increasing control valve, and a pressure reducing brake cylinder passage connecting the brake cylinder pressure detecting device and the pressure reducing control valve, the pressure increasing brake cylinder passage and the pressure reducing brake cylinder passage being formed at different positions in a direction perpendicular to the above-indicated one surface of the holder structure.

Where the pressure increasing and pressure reducing control valves have the same construction wherein the high pressure and low pressure ports of each of these control valves are formed at different positions in the axial direction of the control valves, the positional relationship in the above-indicated axial direction between the brake cylinder pressure detecting device and the pressure increasing and pressure reducing brake cylinder passages is determined by the relationship among the pressure increasing control valve, a high pressure port connected to a high pressure source and a brake cylinder passage connected to the brake cylinder, and the relationship among the pressure reducing control valve, the brake cylinder passage and a low pressure passage connected to a reservoir. In the hydraulic braking pressure control unit according to the above mode (22), the pressure increasing and pressure reducing brake cylinder passages are formed at different positions in the axial direction of the brake cylinder pressure detecting device (axial direction of the control valves).

Therefore, the arrangement according to the above mode (22) eliminates a need of forming a fluid passage in the holder structure, so as to extend in the axial direction of the control valves, and consequently eliminate a need of closing the open ends of this fluid passage, so that the cost of manufacture of the hydraulic braking pressure control unit can be reduced.

(23) A hydraulic braking pressure control unit according to the above mode (21) or (22), wherein the holder structure holds at least two straight arrays of pressure increasing control valves, pressure reducing control valves and brake cylinder pressure detecting devices, which are attached to the above-indicated portion of the holder structure, the holder structure having at least two brake cylinder passages formed for communication with the pressure increasing and pressure reducing control valves and the brake cylinder pressure detecting device of the above-indicated at least two straight arrays, respectively, said holder structure further having a connecting passage formed for communication between two passages of the at least two brake cylinder passages, the hydraulic braking pressure control unit further including a communication control valve which is attached to the above-indicated portion of the holder structure and which is operable to selectively open and close the connecting passage.

(24) A hydraulic braking pressure control unit according to any one of the above modes (4)-(23), wherein the control valves includes at least one group of control valves each consisting of a plurality of electromagnetically operated pressure control valves of the same kind which are arranged along a substantially straight line on the above-indicated surface of the holder structure.

Where the two or more electromagnetically operated pressure control valves of the same kind (of the same size) are arranged along a straight line, the volume of the holder structure can be effectively utilized, making it possible to reduce the required size of the holder structure and the required size of the hydraulic braking pressure control unit.

The electromagnetically operated pressure control valves of the same kind can be usually connected to each other by a single fluid passage. In this case, the control valves are desirably arranged along a straight line. There are various kinds of electromagnetically operated pressure control valves, such as a pressure increasing control valve, a pressure reducing control valve, a master cylinder cut-off valve and a communication control valve The technical feature according to the above mode (24) is applicable to the hydraulic braking pressure control unit according to any one of the above modes (1)-(3). In this case, the two or more hydraulic pressure control components of the same kind are arranged along a straight line. for instance, the brake cylinder pressure detecting devices or the master cylinder pressure detecting devices are arranged along a straight line. Further, two or more groups of the hydraulic pressure control components of different kinds may be arranged such that the corresponding straight rows of the components of the different kinds are parallel to each other.

(25) A holder structure which holds at least three hydraulic pressure control components, wherein the holder structure includes a portion having one surface, and the at least three hydraulic pressure control components are attached to the above-indicated portion of the holder structure such that the hydraulic pressure control components are located at respect apexes of at least one isosceles triangle.

The holder structure according to the above mode (25) may include the technical feature according to any one of the above modes (1)-(24).

(26) A holder structure which holds a plurality of electromagnetically operated hydraulic pressure control valves such that the hydraulic pressure control valves are arranged along a straight line on one surface of the holder structure, the holder structure having a plurality of fluid passages each of which is formed so as to extend in a direction intersecting the straight line, between two adjacent ones of the plurality of electromagnetically operated hydraulic pressure control valves, as seen in a plane of the above-indicated one surface.

The holder structure according to the above modes (26) may include the technical feature according to any one of the above modes (1)-(24).

(27) A hydraulic braking pressure control unit comprising:
a power operated hydraulic pressure source including (a) a pump device having a pump operable to pressurize a working fluid received from a low pressure source and deliver the pressurized fluid, and an electric motor operable to drive the pump, and (b) an accumulator for storing the pressurized fluid delivered from the pump device;
a control valve device including a plurality of control valves capable of controlling a pressure of the working fluid in a brake cylinder, by utilizing the pressurized fluid delivered from the power operated hydraulic pressure source, the plurality of control valves including a pressure increasing control valve disposed between the power operated hydraulic pressure source and the brake cylinder, and a pressure reducing control valve disposed between the brake cylinder and the low pressure source; and
a holder structure which includes a first portion and a second portion respectively having a first surface and a second surface that are opposite to each other, the holder structure holding the power operated hydraulic pressure source and the control valve device such that a main body portion of each of the at least two control valves is attached to the first portion, while main body portions of the accumulator and the electric motor are attached to the second portion, and such that a first row in which the pressure increasing and pressure reducing control valves are arranged and a second row in which the accumulator and the electric motor are arranged are substantially parallel to each other.

In the hydraulic braking pressure control unit according to the above mode (27), the pressure increasing and pressure reducing control valves, electric motor and accumulator are arranged on the holder structure such that the first row consisting of the control valves and the second row consisting of the accumulator and the electric motor are substantially parallel to each other. This arrangement assures more effective utilization of the volume of the holder structure, than a random arrangement of the control valves, accumulator and electric motor. Thus, the present arrangement permits a high degree of integration and significant reduction of size of the unit.

The direction of the first row is defined by a straight line connecting the axes or centerlines of the pressure increasing and pressure reducing control valves. Similar definition applies to the direction of the second row.

The hydraulic braking pressure control unit according to the above mode (27) may include the technical feature according to any one of the above modes (3), (4), (8)-(13), (15), (17) and (22).

(28) A hydraulic braking pressure control unit according to the above mode (24), which includes a plurality of sets of control valves each set consisting of the pressure increasing control valve and the pressure reducing control valve, and wherein the rows of the pressure increasing and pressure reducing control valves of the respective sets are parallel to each other.

In the unit according to the above mode (28) wherein the plurality of sets of pressure increasing and pressure reducing valves are arranged in the respective first rows parallel to each other, the volume of the holder structure is effectively utilized.

The pressure increasing and pressure reducing control valves may be either arranged in a rectangular lattice pattern, or alternatively in a zigzag pattern such that the adjacent three pressure increasing control valves are located at respective apexes of a first isosceles triangle while the adjacent three pressure reducing control valves are located at respective apexes of a second isosceles triangle which is similar to the first isosceles triangle and spaced from the first isosceles triangle in the direction of the first rows. Where the control valves are arranged in the rectangular lattice pattern, a straight line along which the plurality of pressure increasing control valves are arranged and a straight line along which the plurality of pressure reducing control valves are arranged are parallel to each other, and these straight lines are perpendicular to the first rows.

(29) A hydraulic braking pressure control unit according to the above mode (27) or (28), wherein the main body portions of the electric motor and the accumulator are located in an almost central part of the second surface, and the plurality of control valves attached to the first portion are located on opposite sides of a plane which includes axes of the electric motor and the accumulator and which is perpendicular to the first and second surfaces.

Where the control valves are located on the opposite sides of an assembly of the accumulator and electric motor, a plurality of brake cylinder can be conveniently controlled by the control valves, by utilizing the pressurized fluid delivered from only one power operated hydraulic pressure source.

The accuracy of control of the hydraulic braking pressure in the brake cylinders can be improved, particularly where the control valve device includes a plurality of pressure increasing control valves which are arranged to control the pressure of the pressurized fluid received from the accumulator and apply the thus controlled fluid pressure to the brake cylinders, and which control valves are located on the opposite sides of the accumulator located at the central portion of the second surface. This arrangement makes it possible to reduce a difference of pressure losses between the accumulator and the individual pressure increasing control valves. This, the arrangement according to the above mode (29) permits the accumulator, electric motor and control valves to be located at the optimum positions.

(30) A hydraulic braking pressure control unit according to any one of the above modes (27)-(29), further comprising at least one of (i) a pressure relief valve disposed between high pressure and low pressure sides of the power operated hydraulic pressure source, (ii) an output pressure detecting device operable to detect an output pressure of the power operated hydraulic pressure source, and (iii) a brake cylinder pressure detecting device operable to detect the pressure in the brake cylinder, and wherein the above-indicated least one of the pressure relief valve, the output pressure detecting device and the brake cylinder pressure detecting device is attached to the first portion of the holder structure.

The hydraulic braking pressure control unit according to the above mode (30) comprises at least one of the above-indicated pressure relief valve, output pressure detecting device and brake cylinder detecting device, in addition to the power operated hydraulic pressure source and the control valve device. Accordingly, the function of the unit is improved, so that a braking system including the unit can be simplified in construction.

The hydraulic braking pressure in the brake cylinder is controlled by the control valves, by utilizing the pressurized fluid delivered from the power operated hydraulic pressure source. The control valves may be controlled on the basis of the fluid pressure detected by the output pressure detecting device and the hydraulic braking pressure detected by the brake cylinder detecting device. Where electromagnetically operated ones of the control valves, the output pressure detecting device and the brake cylinder detecting device are attached to the same portion of the holder structure, their lead wires can be comparatively easily bundled together.

While the pressure relief valve may be attached to the second portion rather than the first portion, it is usually more advantageous to attach the pressure relief valve to the first portion.

(31) A hydraulic braking pressure control unit according to the above mode (30), wherein the first surface and the second surface of the holder structure are parallel to each other, and the pressure relief valve and the output pressure detecting device attached to the first plane are located near a plane which includes axes of the electric motor and the accumulator and which is perpendicular to the first and second surfaces.

The pressure relief valve is provided to prevent an excessive rise of the delivery pressure of the pump, while the output pressure detecting device is provided to detect the delivery pressure of the pump or the pressure of the pressurized fluid in the accumulator In view of the functions of the pressure relief valve and the output pressure detecting device, they are desirably disposed in a portion of the first surface which is near a portion of the second surface in which the electric motor and the accumulator are disposed. Where the electric motor and the accumulator are disposed in an almost central part of the second surface, for instance, the output pressure detecting device and the pressure relief valve are also located in an almost central part of the first surface, for example. This arrangement makes it possible to reduce the required lengths of the fluid passage connecting the pump and accumulator to the pressure relief valve, and the fluid passage connecting the pump and accumulator to the output pressure detecting device, so that these hydraulic components can be conveniently located.

(32) A hydraulic braking pressure control unit according to any one of the above modes (27)-(31), further comprising a master cylinder cut-off valve operable between an open state for communication between the brake cylinder and a master cylinder operable to pressurize the working fluid to a pressure corresponding to a force of operation of a brake operating member by an operator, and a closed state for isolating the brake cylinder from the master cylinder, and wherein the master cylinder cut-off valve is attached to the first portion of the holder structure.

Where the master cylinder cut-off valve is also attached to the holder structure, the function of the unit can be further improved. A master cylinder pressure detecting device operable to detect the pressure of the fluid in the master cylinder may also be attached to the first portion of the holder structure.

(33) A hydraulic braking pressure control unit according to any one of the above modes (27)-(32), wherein the plurality of control valves are attached to the first portion such that axes of the control valve are substantially perpendicular to the first surface, while the electric motor and the accumulator are attached to the second portion such that axes of the electric motor and the accumulator are substantially perpendicular to the second surface.

Where the control valves include a master cylinder cut-off valve and a pressure relief valve as described, these valves may also be attached to the first portion such that their axes are substantially perpendicular to the first surface. Where the unit further includes an output pressure detecting device, a brake cylinder pressure detecting device and a mater-cylinder pressure detecting device, as described above, these detecting devices may also be attached to the first portion such that their axes are substantially perpendicular to the first surface. Since the first and second surfaces are parallel to each other, all of the hydraulic components held by the holder structure are attaché such that their axes are parallel to each other.

(34) A hydraulic braking pressure control unit according to any one of the above modes (27)-(33), wherein the holder structure has a low pressure passage connected to the low pressure source, and a high pressure passage connected to the accumulator, the low pressure and high pressure passages being formed in an almost middle part of the holder structure as seen in a plane of the second surface.

Where the accumulator and the electric motor are located in an almost middle part of the second surface, the high pressure passage connected to the accumulator and the low pressure passage connected to the low pressure source formed in the holder structure are located in the almost middle part of the second surface, as seen in the plane of the second surface.

The low pressure passage may be a passage formed in communication with a suction passage of the pump, or a passage formed in communication through an exclusive port with a reservoir provided outside the present hydraulic braking pressure control unit. Where the low pressure passage is held in communication with the suction passage of the pump, the required number of the ports can be reduced, and the required size of the unit can be reduced.

(35) A hydraulic braking pressure control unit according to the above mode (34), wherein the low pressure and high pressure passages are formed substantially parallel to each other.

The high pressure and low pressure passages may be parallel to each other as seen in a direction perpendicular to the first and second surfaces, or as seen in a direction parallel to the first and second surfaces. In other words, the high pressure and low-low pressure passages may be formed such that these passages are spaced from each other as seen in the direction perpendicular to the first surface, or such that those passages overlap each other as seen in the direction perpendicular to the first surface, but are spaced apart from each other in the direction perpendicular to the first surface.

(36) A hydraulic braking pressure control unit according to the above mode (34) or (35), wherein the pressure reducing control valve is held in communication with the low pressure passage, while the pressure increasing valve is held in communication with the high pressure passage.

(37) A hydraulic braking pressure control unit according to any one of the above modes (34)-(36), further comprising a pressure relief valve disposed between high pressure and low pressure sides of the power operated hydraulic pressure source, and wherein the pressure relief valve is connected to both the low pressure and high pressure passages.

Where the pressure increasing control valve is held in communication with the high pressure passage while the pressure reducing control valve is held in communication with the low pressure passage, the pressure relief valve is desirably disposed between the high pressure and low pressure passages, for eliminating a need of providing an exclusive fluid passage for the pressure relief valve, so that the required number of the fluid passages can be reduced, making it possible to reduce the required size of the hydraulic braking pressure control unit.

The high pressure passage is usually provided with an output pressure detecting device for detecting the output pressure of the power operated hydraulic pressure source. In case, the pressure relief valve and the output pressure detecting device are disposed relatively close to each other. The pressure relief valve is required to be held in communication with both of the high pressure and low pressure passages, while the output pressure detecting device is required to be disposed so as to prevent an interference with the low pressure passage. To this end, the high pressure and low pressure passages are connected to the respective high pressure and low pressure ports of the pressure relief valve, for example, so that the high pressure and low pressure passages are separated from each other with the pressure relief valve interposed therebetween. This arrangement permits the low pressure passage to be formed, so as to prevent an interference with the output pressure detecting device. Thus, the pressure relief valve can be provided without forming an exclusive fluid passage, thereby making it possible to reduce the required size of the unit.

(38) A hydraulic braking pressure control unit according to any one of the above modes (27)-(37), wherein the holder structure has a plurality of brake cylinder passages which are held in communication with a plurality of brake cylinders, respectively and which are formed in parallel with each other.

The plurality of brake cylinder passages can be efficiently formed in the holder structure, where the brake cylinder passages extend in parallel with each other. For instance, the high pressure and low pressure passages are formed in an almost middle or central part of the holder structure, while the brake cylinder passages are formed on opposite sides of the high pressure and low pressure passages. Where a braking system including the present unit has two sub-systems, the brake cylinder passages may be formed such that the brake cylinder passage connected to each brake cylinder of one of the sub-systems is/are located on one of the opposite sides of the passages, while the brake cylinder passage connected to each brake cylinder of the other sub-system is/are located on the other side. A similar arrangement is applicable where a plurality of sets of pressure increasing and pressure reducing control valves are disposed along respective parallel first rows corresponding to respective brake cylinders.

At least one master cylinder passage communicating with a master cylinder may be formed in parallel with the brake cylinder passages. Each master cylinder passage may be spaced from the brake cylinder passages as seen in a direction perpendicular to the first surface of the holder structure, or may overlap one of the brake cylinder passages as seen in the direction perpendicular to the first surface, but are spaced from each other as seen in a direction parallel to the first surface.

(39) A hydraulic braking pressure control unit according to any one of the above modes (27)-(38), wherein the accumulator includes a housing, a partition member which fluid-tightly divides an interior of the housing into two variable-volume chambers, and a connecting portion which is held in communication with one of the two variable-volume chambers and which has two ports that are spaced from each other in an axial direction of the housing, the two ports consisting of an inner port located at an end of the connecting portion, and an intermediate port located between the inner port and the one variable-volume chamber, and where the pressure increasing control valve is connected to the inner port while the pump device is connected to the intermediate port.

The pump and the pressure increasing control valve are connected to the accumulator at different axial positions of the accumulator. In this arrangement, a fluid passage connected to the pump and a fluid passage connected to the pressure increasing control valve may be formed in the holder structure such that these two fluid passages overlap each other as seen in the direction perpendicular to the second surface, but are spaced apart from each other as seen in the direction parallel to the second surface.

Each fluid passage is usually formed in the holder structure, so as to extend linearly in a direction parallel to the first or second surface. Accordingly, two hydraulic components connected to each other by the fluid passage are usually attached to the holder structure, with suitable amounts of local embedment and projection of the components in and from the holder structure, such that two ports of the two components are located at the same position in the direction perpendicular to the second surface (in the direction of thickness of the holder member between the first and second surfaces).

For instance, the amounts of local embedment and projection of the accumulator and the pressure increasing control valve in and from the holder structure in the direction of thickness of the holder structure, and the positions in this direction of a delivery passage of the pump and a supply passage connecting the accumulator and the pressure increasing control valve are determined so that the discharge port of the pump and the pump-side port of the accumulator are located at the same position in the direction of thickness of the holder structure (at the same depth position from the first or second surface), while the control-valve side port of the accumulator and the high pressure port of the pressure increasing control valve are located at the same position in the direction of thickness.

(40) A hydraulic braking pressure control unit according to any one of the above modes (27)-(39), wherein each of the pressure increasing control valve and the pressure reducing control valve has a high pressure port formed at one end thereof, and a low pressure port located between the above-indicated one end and other end as seen in an axial direction of the control valve.

Each of the pressure increasing and pressure reducing control valves includes a connecting portion having the ports, and a solenoid. The connecting portion is a portion of a seating valve in which the ports are formed. The connecting portion and the solenoid are located relatively near the inner and outer end portions of the control valve, respectively. Usually, the control valve is embedded at its inner end portion in the holder structure, while at least a portion of the solenoid projects from the first surface of the holder structure. This arrangement is applicable to the master cylinder cut-off valve described above.

(41) A hydraulic braking pressure control unit according to any one of the above modes (27)-(40), wherein the holder structure further includes a third portion having a third surface which intersects said first and second surfaces, the holder structure having ports open in the third surface, for connection to the low pressure source and the brake cylinder.

Where the plurality of ports for connection with the low pressure source and brake cylinder are open in one surface of the holder structure, the hydraulic braking pressure control unit can be easily installed on a desired member, such as a member of the body of an automotive vehicle for which the unit is used.

In the unit according to the above mode (41), the electric motor and the accumulator are desirably attached to the second portion of the holder structure such that the electric motor is relatively near the third surface while the accumulator is relatively distant from the third surface. This arrangement is effective to reduce a resistance of flow of the working fluid from the low pressure source to the pump, and is accordingly effective to reduce pressure pulsation of the pressurized fluid delivered from the pump.

The pump driven by the electric motor may be a plunger pump or a gear pump. The port for connection with the master cylinder is desirably formed to be open also in the third surface.

(42) A hydraulic braking pressure control unit according to any one of the above modes (27)-(41), further comprising at least one of (i) a reservoir for storing the working fluid discharged from the brake cylinder, and (ii) a stroke simulator for connection to a master cylinder, for flows of the working fluid between the stroke simulator and the master cylinder as a pressurizing piston of the master cylinder is moved, and wherein the holder structure holds the above-indicated at least one of the reservoir and the stroke simulator.

The reservoir and/or the stroke simulator may be attached to the holder structure.

(43) A hydraulic braking pressure control unit comprising:
a power operated hydraulic pressure source including (a) a pump device having a pump operable to pressurize a working fluid received from a low pressure source and deliver the pressurized fluid, and (b) an accumulator for storing the pressurized fluid delivered from the pump device;
a control valve device including a plurality of control valves capable of controlling a pressure of the working fluid in respective brake cylinders, by utilizing the pressurized fluid delivered from the power operated hydraulic pressure source, the brake cylinders being operable to activate respective brakes for braking respective wheels of a vehicle; and
a holder structure which holds the power operated hydraulic pressure source and the control valve device and which includes a first portion and a second portion respectively having a first surface and a second surface which are opposed to each other,
and wherein the control valve device includes a plurality of pressure increasing control valves disposed between the power operated hydraulic pressure source and the brake cylinders, respectively, and a plurality of pressure reducing control valves disposed between the low pressure source and the brake cylinders, respectively, and main bodies of the accumulator and the electric motor are attached to an almost middle part of the second surface of the holder structure, the plurality of pressure increasing control valves and the plurality of pressure reducing control valves consisting of two groups of control valves which are attached to respective two areas of the first surface which are located on opposite sides of a row in which the accumulator and said electric motor are arranged on the second surface.

The hydraulic braking pressure control unit according to the above mode (43) may include the technical feature according to any one of the above modes (3), (4), (8)-(3), (15), (17), (22), and (27)-(42).

(44) A holder structure of generally block shape for holding at least one control valve, and a power operated hydraulic pressure source including (a) a pump device having a pump operable to pressurize a working fluid received from a low pressure source and deliver the pressurized fluid, and (b) an accumulator for storing the pressurized fluid delivered from the pump device, the holder structure having:
a first portion and a second portion respectively having a first surface and a second surface which are opposed to each other;
at least one control-valve recess each of which is open in the first surface, for receiving at least a portion of a corresponding one of the at least one control valve;
an accumulator recess which is open in the second surface, for receiving at least a portion of the accumulator;
a drive-force transmitting recess which is open in the second surface, for receiving a drive-force transmitting portion of the power operated hydraulic pressure source which is arranged to transmit a rotary motion of the electric motor to the pump.

(45) A hydraulic braking pressure control unit comprising:
a power operated hydraulic pressure source including (a) a pump device having a pump operable to pressurize a working fluid received from a low pressure source and deliver the pressurized fluid, and an electric motor operable to drive the pump, and (b) an accumulator for storing the pressurized fluid delivered from the pump device;
a control valve device including at least one control valve capable of controlling a pressure of the working fluid in a brake cylinder, by utilizing the pressurized fluid delivered from the power operated hydraulic pressure source; and
a holder structure which holds the power operated hydraulic pressure source and the control valve device.

In a braking system including the hydraulic braking pressure control unit according to the above mode (45), the pressure of the fluid in the brake cylinder is controlled by the control valve device, by utilizing the pressurized fluid delivered from the power operated hydraulic pressure source. Where the control valve device controls a plurality of brake cylinders, at least one control valve may be provided for each other the brake cylinders, or for two or more of the brake cylinders.

In the present hydraulic braking pressure control unit, the single holder structure holds the power operated hydraulic pressure source and the control valve device. The fluid pressure in each brake cylinder can be controlled by controlling the power operated hydraulic pressure source and the control valve device held by the single holder structure.

The holder structure preferably takes the form of a holder block, desirably, a generally hexahedron block. A hexahedron has three pairs of opposite surfaces. However, the opposite surfaces of each pair may be either parallel to each other or not parallel to each other. It is possible that the opposite surfaces of one pair or each of two pairs are parallel to each other while the opposite surfaces of the other pair or pairs are not parallel to each other. Where the holder structure is a rectangular parallelepiped, the opposite surfaces of each of the three pairs are parallel to each other. The volume of the holder structure can be relatively efficiently utilized for forming fluid passages where the holder structure takes the form of a rectangular parallelepiped. Further the fluid passages can be relatively easily formed in the rectangular parallelepiped. In addition, the control valve device and the power operated hydraulic pressure source can be easily attached to the rectangular parallelepiped, and the hydraulic braking pressure control unit can be easily attached to the body of a vehicle.

The hydraulic braking pressure control unit according to the above mode (45) may include the technical feature according to any one of the above modes (27-44).

(46) A hydraulic braking pressure control unit according to the above mode (45), wherein the holder structure has a first portion and a second portion respectively having a first surface and a second surface which are opposed to each other, and holds the above-indicated at least one control valve such that a main body portion of each control valve is fixed to the first portion of the holder structure, while main body portions of the accumulator and the electric motor are fixed to the second portion of the holder structure.

In the hydraulic braking pressure control unit according to the above mode (46), the main body portion of each of the at least one control valve is attached to the first portion of the holder structure, while the main body portion of each of the electric motor and accumulator is attached to the second portion of the holder structure. Namely, the accumulator is not disposed on a third portion having a third surface other than the first and second surfaces, the control valve device and the power operated hydraulic pressure source can be efficiently disposed on the holder structure, so that the required size of the unit can be reduced.

Where the main body portion of the control valve is attached to the first portion of the holder structure, the control valve is usually attached to the holder structure such a portion of the main body portion is received in a recess open in the first surface while the remaining portion projects from the first surface. The portion received in the recess may be larger or smaller than the portion projecting from the first surface. In either case, the recess formed in the holder structure may function as a part of the control valve. In this case, the recess and the main body portion constitute the control valve. Where the recess does not function as a part of the control valve, in other words, where the control valve is complete before attachment to the holder structure, the main body portion alone constitutes the control valve. The recess functioning as a part of the control valve may partially define a fluid chamber or a fluid passage. The above description is applicable to the accumulator.

The electric motor may be attached to the holder structure such that a drive portion of the motor projects from the second surface while a drive-force transmitting portion of the motor is received in a hole open in the second surface. Where the pump is a plunger pump, for instance, an eccentric-cam portion serving as the drive-force transmitting portion of the electric motor is received in the hole, while the drive portion projects from the second surface. The eccentric-cam portion may be considered to be an element of the pump. In this case, a rotation transmitting portion which transmits a rotary motion of the drive portion to the eccentric-cam portion may be considered to be the drive-force transmitting portion of the electric motor.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
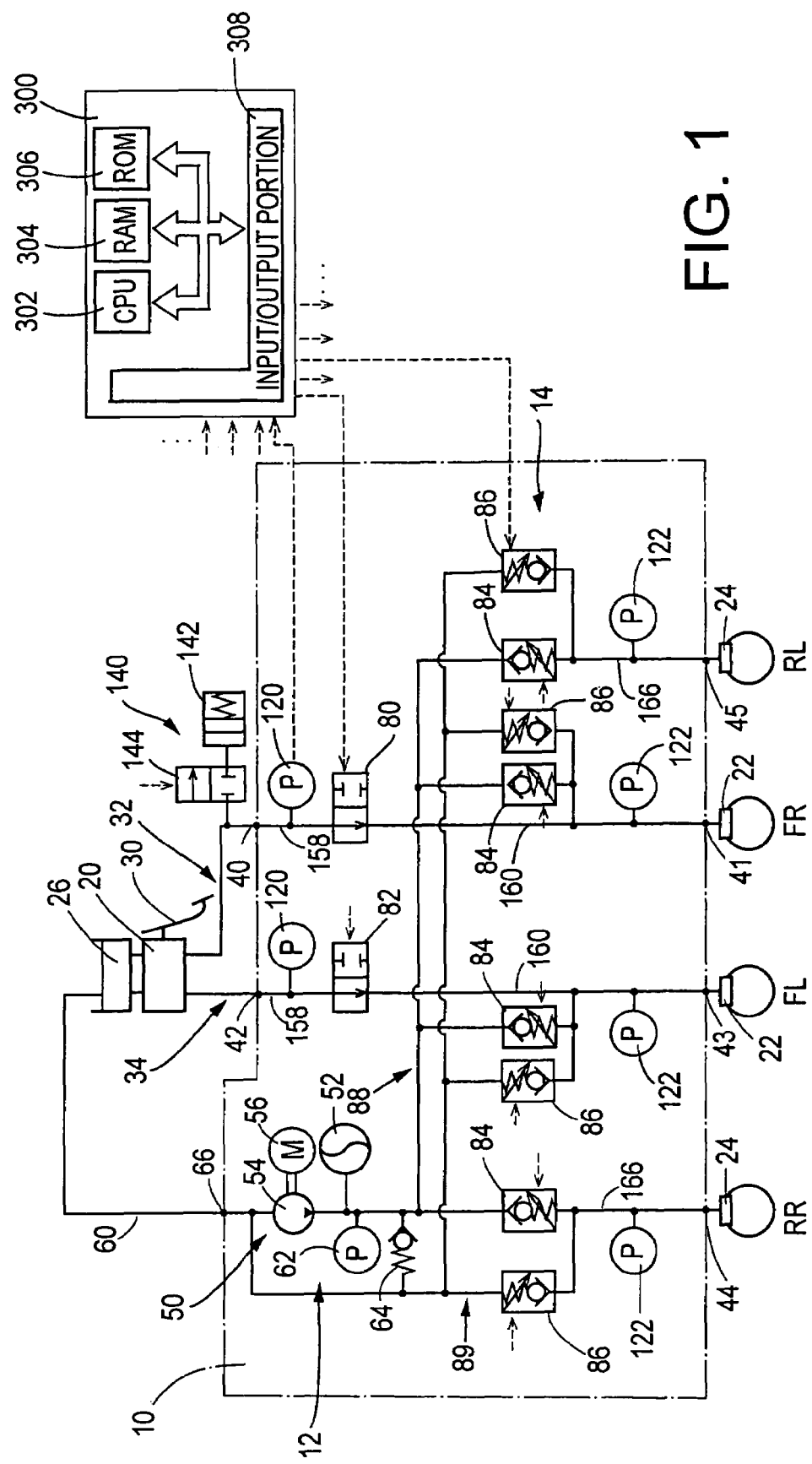
FIG. 1 is a circuit diagram of a braking system including a hydraulic braking pressure control unit constructed according to one embodiment of this invention.

Referring FIGS. 1-14, there will be described an automotive vehicle braking system incorporating a hydraulic braking pressure control unit constructed according to one embodiment of this invention. In FIG. 1, reference numeral 10 denotes a hydraulic braking pressure control unit. This hydraulic braking pressure control unit 10 (hereinafter referred to simply as "unit 10") includes a power operated hydraulic pressure source 12, a hydraulic pressure control valve device 14 and a plurality of hydraulic pressure sensors. The hydraulic pressure control valve device 14 includes a plurality of hydraulic pressure control valves. The unit 10 has a plurality of ports to which are connected a master cylinder 20, brake cylinders 22 for front wheels FL, FR, brake cylinders 24 for rear wheels RL, RR, and a master reservoir 26.

The master cylinder 20 is of a tandem type including two pressurizing pistons one of which is operatively connected to a brake operating member in the form of a brake pedal 30. The front surfaces of the two pressurizing pistons partially define respective pressurizing chambers to which are connected respective fluid passages 32, 34. The brake cylinder 22 for the front right wheel FR is connected through the unit 10 to the fluid passage 32, while the brake cylinder 22 for the front left wheel FL is connected through the unit 10 to the other fluid passage 34. In the present embodiment, the two pressurizing chambers are connected to the two front wheel brake cylinders 22, respectively.

The power operated hydraulic pressure source 12 is connected to the brake cylinders 22 for the front right and left wheels, and to the brake cylinders 24 for the rear right and left wheels. The front right and left wheel brake cylinders 22 are connected to both of the master cylinder 20 and the power operated hydraulic pressure source 12, while the rear right and left wheel brake cylinders 24 are not connected to the master cylinder 20, but are connected to only the power operated hydraulic pressure source 12. Hydraulic braking pressures in the wheel brake cylinders 22, 24 are controlled by the plurality of pressure control valves of the control valve device 14, by utilizing the pressurized fluid delivered from the power operated hydraulic pressure source 12.

The fluid passage 32 consists of a first portion between the master cylinder 20 and the unit 10, a second portion formed within the unit 10, and a third portion between the unit 10 and the front right wheel brake cylinder 22. The first portion is connected to a port 40 of the unit 10, while the third portion is connected to a port 41 of the unit 10. Similarly, the fluid passage 34 consists of a first portion connecting the master cylinder 20 and a port 42 of the unit 10, a second portion formed through the unit 10, and a third portion connecting a port 43 of the unit and the front left wheel brake cylinder 22.

The rear right wheel brake cylinder 24 is connected through a fluid passage to a port 44 of the unit 10, while the rear left wheel brake cylinder 24 is connected through a fluid passage to a port 45 of the unit 10.

The power operated hydraulic pressure source 12 includes a pump device 50, and an accumulator 52. The pump device 50 includes a plunger pump 54 of two cylinder type (hereinafter referred to simply as "pump 54"), an electric motor 56 serving as a pump motor to drive the pump 54, and an eccentric cam portion (not shown) serving as a drive-force transmitting portion. The pump 54 has two cylinders. The eccentric cam portion has an eccentric cam which is rotated by a drive force produced by the motor 56, to reciprocate pistons within the respective two cylinders. The pump 54 is connected to the master reservoir 26 through a reservoir passage 60, so that the pump 54 is operated to pressurize a working fluid received from the master reservoir 26.

To the discharge side of the pump 54, there is connected the accumulator 52, which stores or accommodates the pressurized fluid delivered from the pump 54. The pressure of the pressurized fluid stored in the accumulator 52 is detected by an accumulator pressure sensor 62. The motor 56 is controlled such that the pressure detected by the accumulator pressure sensor 62 is held within a predetermined range.

A fluid passage connecting the discharge side of the pump 54 and the reservoir passage 60 is provided with a pressure relief valve 64, which is provided to prevent an excessive rise of the delivery pressure of the pump 54. The reservoir passage 60 has a portion connecting the master reservoir 26 and a port 66 of the unit 10.

Figure 2:
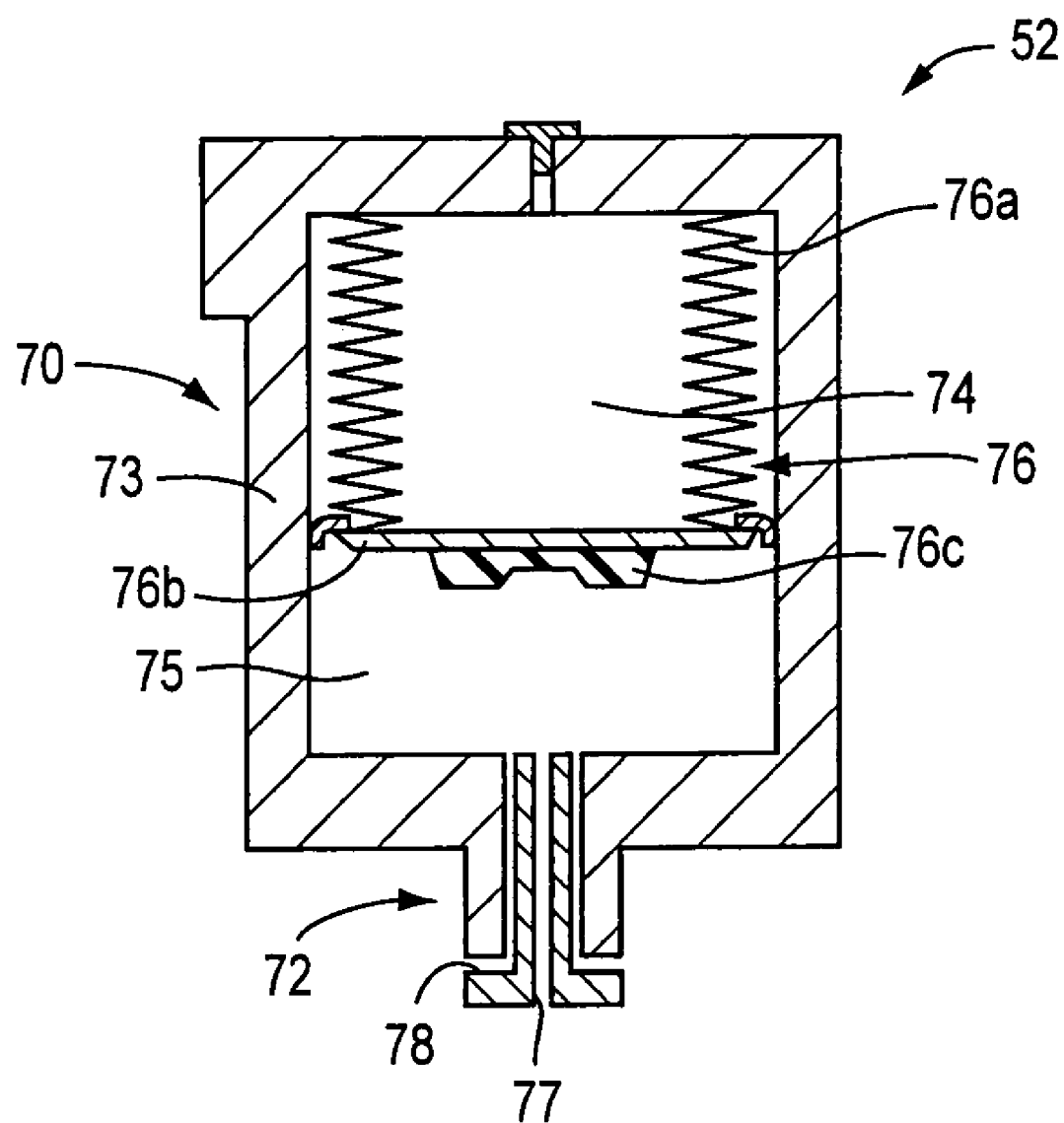
FIG. 2 is a schematic view of an accumulator provided in the hydraulic braking pressure control unit of FIG. 1.

As shown in FIG. 2, the accumulator 52 includes an accumulator portion 70 and a connecting portion 72. The accumulator portion 70 is of bellows type, including a housing 73 and a partition member 76 which divides the interior space of the housing 73 into two variable-volume chambers 74, 75. The partition member 76 consists of a metallic bellows 76a, a bottom plate 76b and a sealing member 76c. The variable-volume chamber 74 (gas chamber) is charged with a high pressure gas, while the other variable-volume chamber 75 is used to store the pressurized fluid delivered from the pump 54.

The connecting portion 72 has two ports 77, 78 which are spaced from each other in the axial direction of the accumulator 52. The port 77 at the end of the connecting portion 72 is connected to pressure increasing linear control valves 84 (which will be described), while the port 78 at an intermediate part of the connecting portion 72 is connected to the pump 54.

The hydraulic pressure control valve device 14 includes two solenoid-operated shut-off valves 80, 82 and four sets of linear control valves 84, 86. Each of the shut-off valves 80, 82 is selectively opened and closed to selectively permit and inhibit a flow of the fluid therethrough, upon application and removal of an electric current to and from its coil. Each of the linear control valves 84, 86 is capable of continuously controlling a pressure difference on its opposite sides.

Each of the shut-off valves 80, 82 and linear control valves 84, 86 has two ports communicating with the appropriate fluid passages. The two ports are spaced from each other in the axial direction of the valve.

The solenoid-operated two shut-off valves 80, 82 are provided between the master cylinder 20 and the respective brake cylinders 22 for the front right and left wheels, to selectively permit and inhibit communication of the wheel brake cylinders 22 with the master cylinder 20. In this sense, the solenoid-operated shut-off valves 80, 82 may be called master cylinder cut-off valves.

The four sets of linear control valves 84, 86 are provided for the respective four wheel brake cylinders 22, 24. The linear control valve 84 of each set, which serves as pressure increasing linear control valve, is provided in a fluid passage 88 connecting the corresponding wheel brake cylinder 22, 24 and the accumulator 52. The other linear control valves 86 of the set, which serves as a pressure reducing linear control valve, is provided in a fluid passage 89 connecting the corresponding wheel brake cylinder 22, 24 and the reservoir 26. In the present embodiment, the hydraulic braking pressure in each wheel brake cylinder 22, 24 is controlled by the pressure increasing and pressure reducing linear control valves 84, 86, by utilizing the pressurized fluid delivered from the power operated hydraulic pressure source 12, while the solenoid-operated shut-off valves 80, 82 are held in the closed state (that is, while the wheel brake cylinder 22, 24 is isolated from the master cylinder 20).

Figure 3:
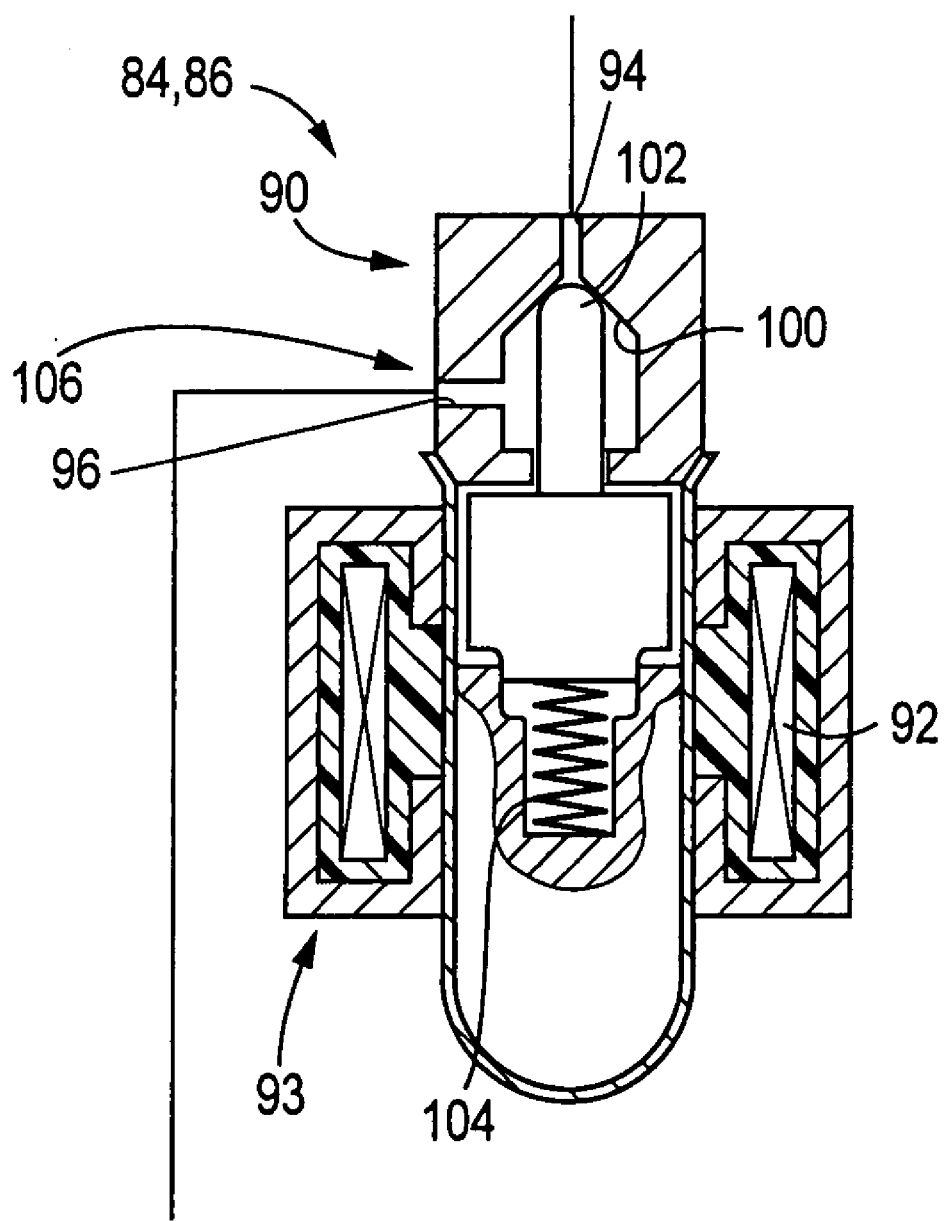
FIG. 3 is an elevational view in cross section schematically showing a linear control valve provided in the hydraulic braking pressure control unit of FIG. 1.

As shown in FIG. 3, each of the pressure increasing and pressure reducing linear control valves 84, 86 includes a seating valve 90, and a solenoid 93 provided with a coil 92. The seating valve 90 has a high pressure port 94 at its end, and a low pressure port 96 at an axially intermediate portion thereof.

The seating valve 90 has a valve seat 100, a valve member 102 movable toward and away from the valve seat 100, and a spring 104 biasing the valve member 102 in a direction that causes the valve member 102 to be seated on the valve seat 100. The high pressure port 94 is open in the valve seat 100. While no electric current is applied to the coil 92, the valve member 102 is held seated on the valve seat 100, under a biasing action of the spring 104, so that the seating valve 90 is held in the closed state. While an electric current is applied to the coil 92, the solenoid 93 produces an electromagnetic force acting on the valve member 102 in a direction that cause the valve member 102 to be moved away from the valve seat 100. At the same time, a force based on a difference between the fluid pressures at the high pressure and low pressure ports 94, 97 acts on the valve member 102 in the direction to cause the movable member 102 to be moved away from the valve seat 100. A position of the valve member 102 relative to the valve seat 100 is determined by the electromagnetic force, the biasing force of the spring 104 and the force based on the pressure difference, so that the pressure difference across the seating valve 90 can be controlled by controlling the amount of electric current to be applied to the coil 90.

A portion of the seating valve 90 having the high pressure port 94 and the low pressure port 96 constitutes a connecting portion 106. In the present embodiment, the entirety of each of the pressure increasing linear control valves 84 and the pressure reducing linear control valves 86 is considered to be a main body portion of a control valve which is capable of functioning to control the hydraulic braking pressure in the corresponding wheel brake cylinder 22, 24.

Each pressure increasing linear control valve 84 is connected at its high pressure port 94 to the power operated hydraulic pressure source 12, and at its low pressure port 96 to the corresponding wheel brake cylinder 22, 24. On the other hand, each pressure reducing linear control valve 96 is connected at its high pressure port 94 to the corresponding wheel brake cylinder 22, 24, and at its low pressure port 96 to the reservoir 26.

Each of the master cylinder cut-off valves 80, 82 described above includes a seating valve and a solenoid, and is similar in arrangement with the linear control valves 84, 86. However, the master cylinder cut-off valves 80, 82 are different from the linear control valves 84, 86 in that the cut-off valves 80, 82 are merely opened and closed upon energization and deenergization of a solenoid coil, without a control of the amount of electric current applied to the coil, and in that the valve member is biased by a spring, in a direction that causes the valve member to be moved away from the valve seat. Each master cylinder cut-off valve 80, 82 is a normally open valve which is held in the open state while the coil is in the deenergization state.

The pressure of the pressurized fluid delivered from the master cylinder 20 is detected by two master cylinder pressure sensors 120, while the pressures of the fluid in the wheel brake cylinders 22, 24 are detected by respective four brake cylinder pressure sensors 122. The two master cylinder pressure sensors 120 are connected to the respective two pressurizing chambers of the master cylinder 20, while the four brake cylinder pressure sensors 122 are connected to the respective fluid passages connected to the respective four wheel brake cylinders 22, 24.

The fluid passage 32 is provided with a stroke simulator device 140, which includes a stroke simulator 142 and a simulator control valve 144. While the master cylinder cut-off valves 80, 82 are held in the closed state, the fluid delivered from the master cylinder 20 is absorbed in the stroke simulator 142, so that the brake pedal 30 can be operated such that its operating stroke is increased with the operating force, even in the closed state of the cut-off valves 80, 82.

Figure 4:
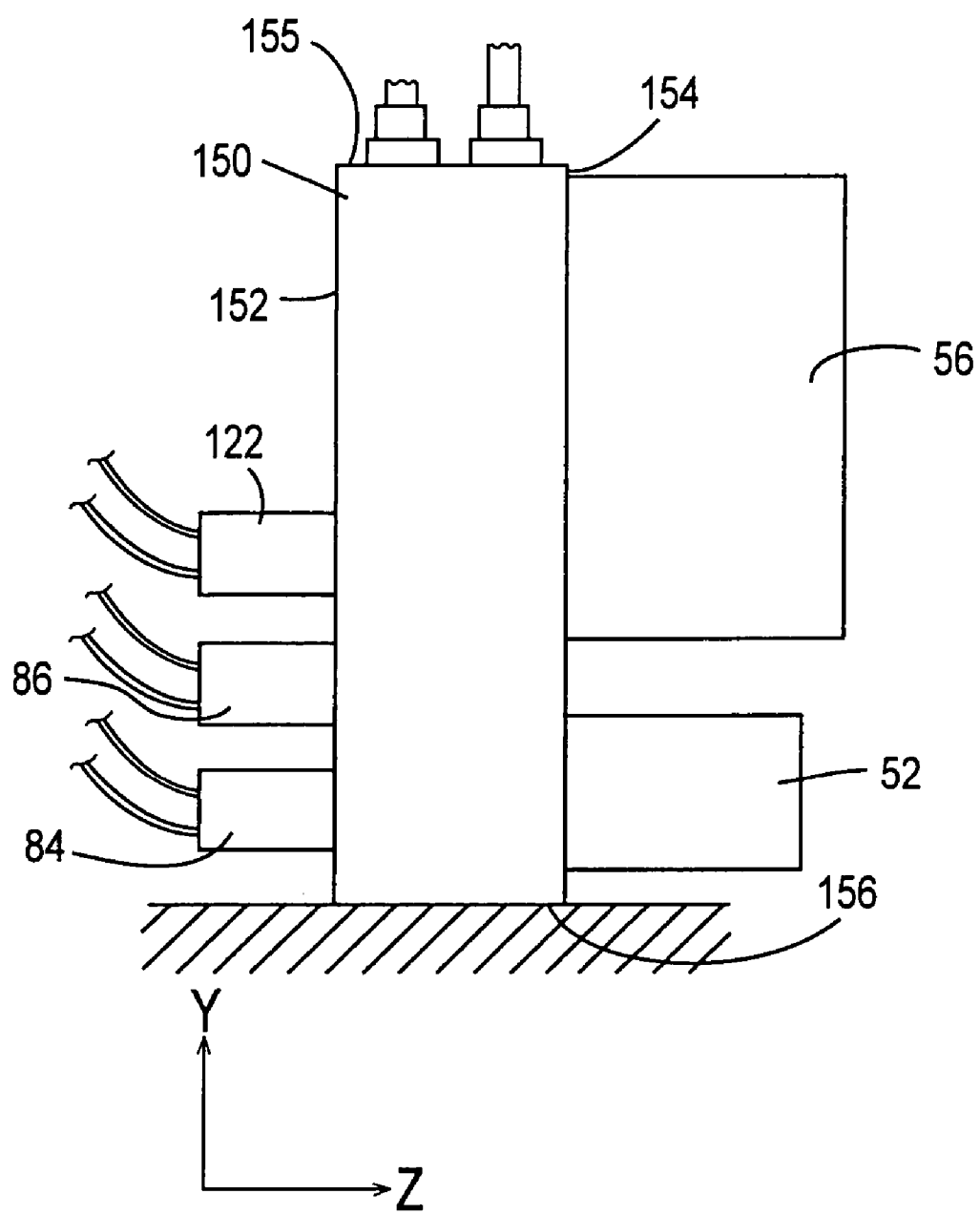
FIG. 4 is a view schematically showing a general arrangement of the hydraulic braking pressure control unit.

As shown in FIG. 4, the unit 10 uses a holder block 150 as a holder structure, which takes the form of a generally hexahedron block, more precisely a generally rectangular parallelepiped. The unit 10 consists of this holder block 150, and the control valves 64, 80, 82, 84, 86, pressure sensors 62, 120, 122, power operated hydraulic pressure source 12, etc. which are attached to the holder block 150 as described below in detail. The unit 10 which is thus obtained as a single structure and which includes the power operated hydraulic pressure source 12 as well as the control valves and pressure sensors is capable of functioning as a high-performance hydraulic braking pressure control unit operable to control the hydraulic braking pressures in the wheel brake cylinders 22, 24.

Figure 8:
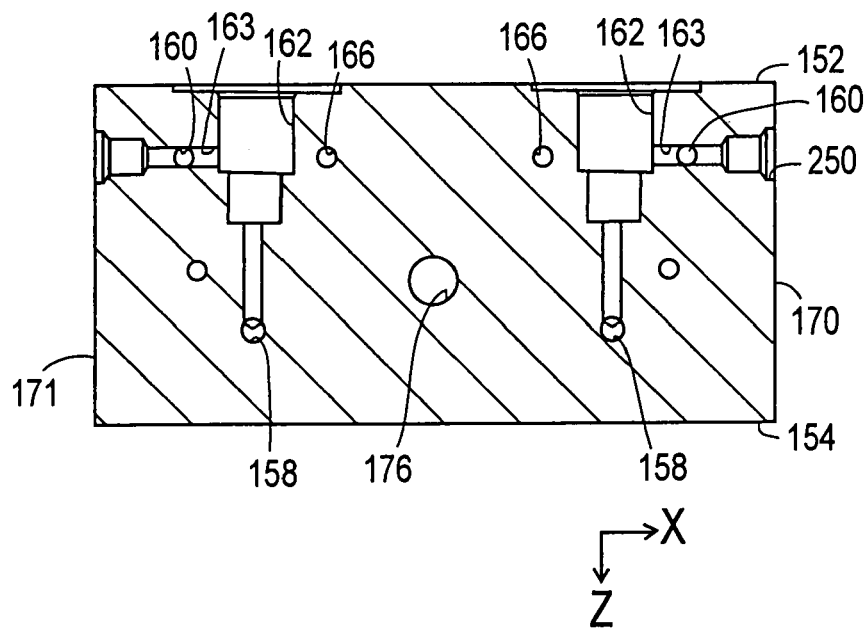
FIG. 8 is a cross sectional view of the pressure control unit taken along line 8-8 of FIG. 5.

The holder block 150 has three pairs of parallel opposed surfaces. Namely, the holder block 150 has a first surface 152 (parallel to an XY plane), a second surface 154 parallel to the first surface 152, a third surface 155 (parallel to an XZ plane) perpendicular to the first and second surfaces 152, 154, a fourth surface 156 parallel to the third surface 155, as shown in FIG. 4, and a fifth and a sixth surface 170, 171 as shown in FIG. 8, for example. The fifth surface 170 (parallel to a YZ plane) is perpendicular to the first through fourth surfaces 152, 154, 155, 156, and the sixth surface 171 is parallel to the fifth surface 170. The holder block 150 includes six side portions respectively having the first through sixth surfaces 152, 154, 155,156,170, 171.

To the first surface 152 of the holder block 150, there are attached the electromagnetically operated control valves such as the pressure increasing linear control valves 84 and pressure reducing linear control valves 86, and the pressure sensors such as the brake cylinder pressure sensors 122. To the second surface 154, there are attached the motor 56 and the accumulator 52. For example, each electromagnetically operated control valve is mounted on the first surface 152 such that at least the connecting portion (106) of the control valve is received in a mounting recess formed in the first surface 152, while at least a portion of the solenoid portion of the control valve projects from the first surface 152. Similarly, the accumulator 52 is mounted on the second surface 154 such that at least the connecting portion 72 of the accumulator 52 is received in a mounting recess formed in the second surface 154 while at least a portion of the accumulator portion 70 projects from the second surface 154.

The third surface 155 has the ports 40-45 and 66 described above. The holder block 150 is attached at its fourth surface 156 to the body of the automotive vehicle. Since all of the ports are open in the third surface 155, the holder block 150 can be easily attached to the vehicle body.

As shown in FIGS. 5-8, the holder block 150 has a master cylinder passage 158 communicating with the port 40, and a brake cylinder passage 160 communicating with the port 41. The master cylinder passage 158 and the brake cylinder passage 160 are connected to each other through the master cylinder cut-off valve 80. The master cylinder passage 158 and the brake cylinder passage 160 constitute the above-indicted second portion of the fluid passage 32, which is formed through the unit 10 or holder block 150. Reference numeral 162 denotes master cylinder cut-off valve recesses which are formed in the first surface 152, for attaching the master cylinder cut-off valves 80, 82.

The master cylinder cut-off valve recess 162, master cylinder passage 158 and brake cylinder passage 160 are formed such that the master cylinder cut-off valve 80 attached at the master cylinder cut-off valve recess 162 is held at one of its ports with the master cylinder passage 158, and at the other port with the brake cylinder passage 160 through a communication passage 163.

The first surface 152 also has a master cylinder pressure sensor recess 164 and a brake cylinder pressure sensor recess 165, which are provided for the fluid passage 32. The master cylinder pressure sensor recess 164 is formed such that a detecting portion of the master cylinder pressure sensor 120 attached at the recess 164 is held in communication with the master cylinder passage 158. The brake cylinder pressure sensor recess 165 is formed such that a detecting portion of the brake cylinder pressure sensor 122 attached to the recess 165 is held in communication with the brake cylinder passage 160. The master cylinder passage 158 and the brake cylinder passage 160 are formed so as to extend in the Y-axis direction.

The master cylinder cut-off valve recess 162, master cylinder pressure sensor recess 164 and brake cylinder recess 165 are also provided for the master cylinder passage 158 communicating with the port 42 of the unit 10 and the brake cylinder passage 160 communicating with the port 43. These passages 158, 160 constitute the above-indicated second portion of the fluid passage 34 formed through the unit 10 (holder block 150). The master cylinder cut-off valve 82 is disposed between these passages 158, 160.

The ports 44 and 45 are held in communication with respective brake cylinder passages 166 connected to the rear left and right wheel brake cylinders 24. The brake cylinder passages 166 are not in communication with the master cylinder passage 158. The brake cylinder passages 160, 166 are provided with the pressurized working fluid which is delivered from the power operated hydraulic pressure source 12 and the pressure of which is controlled by the pressure increasing and pressure reducing linear control valves 84, 86. In this sense, the brake cylinder passages 160, 166 may be called controlled-pressure passages.

The brake cylinder passages 166 are formed so as to extend in the Y-axis direction, in parallel with the brake cylinder passages 160, such that the passages 166 are spaced from the passages 160 in the X-axis direction, and are located at the same Z-axis position as the passages 160. Each of the two master cylinder passages 158 is formed between the corresponding two brake cylinder passages 160, 166 such that the master cylinder passage 158 is spaced from the brake cylinder passages 160, 166 in the Z-axis direction.

Figure 5:
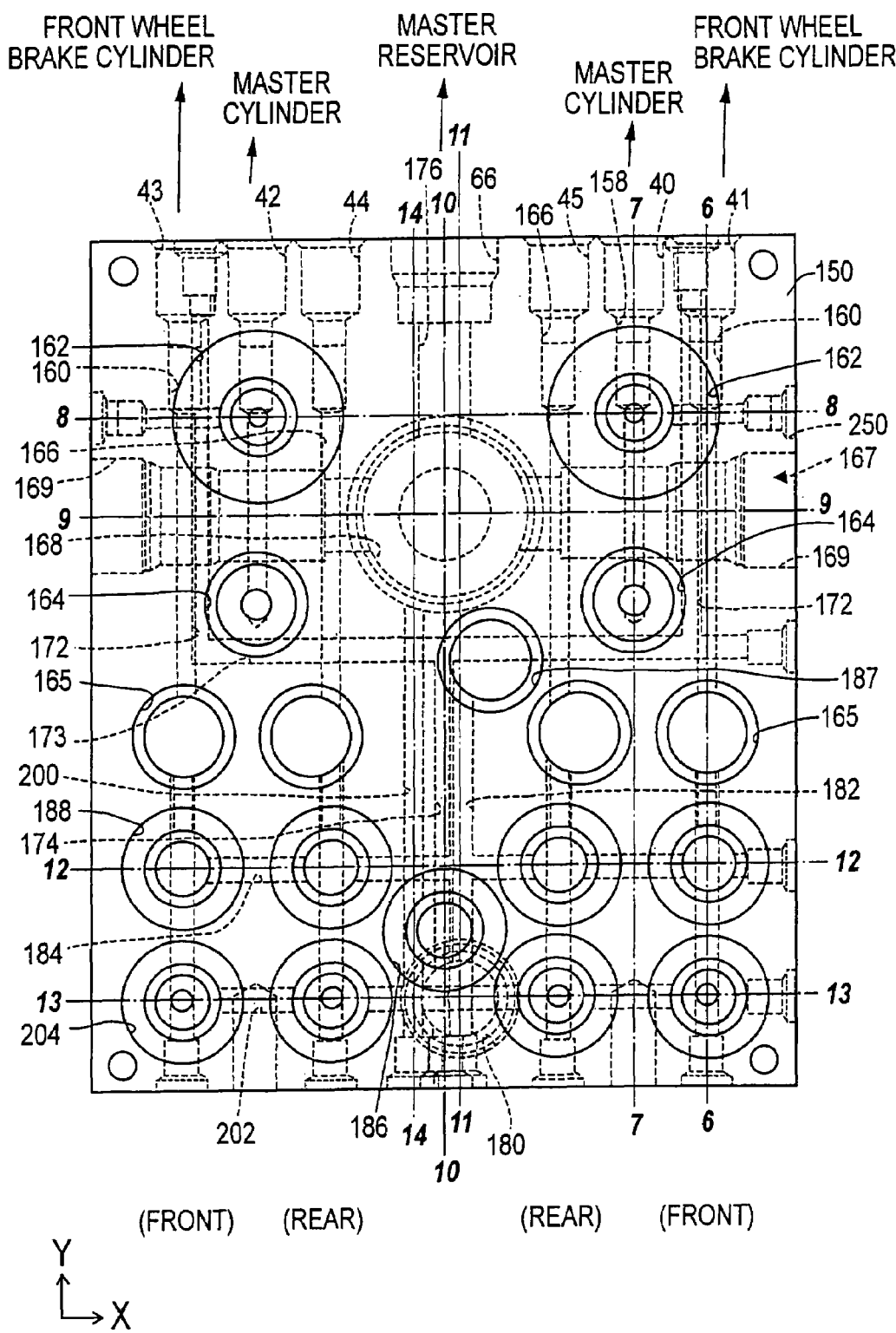
FIG. 5 is a plane view of the hydraulic braking pressure control unit.
Figure 9:
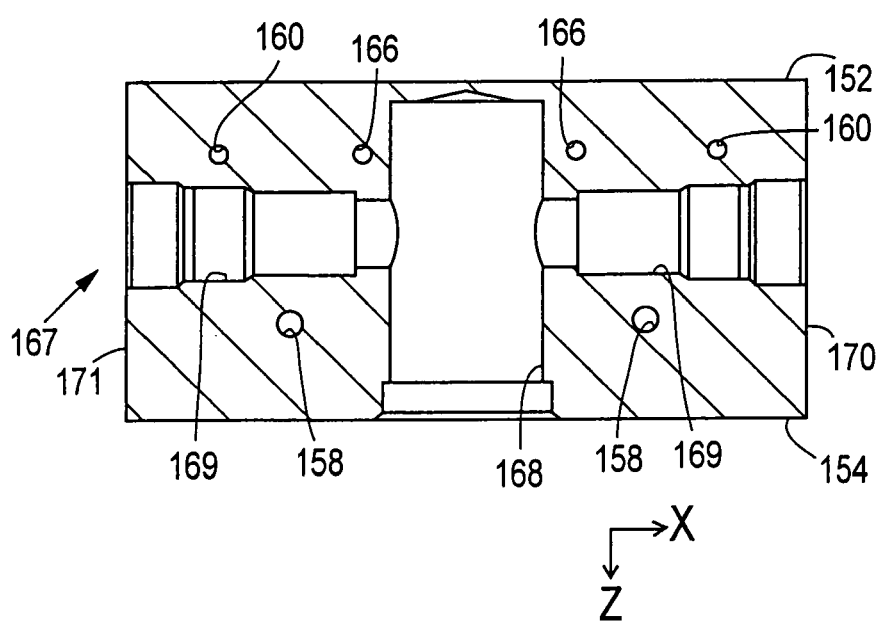
FIG. 9 is a cross sectional view of the pressure control unit taken along line 9-9 of FIG. 5.

The holder block 150 further has a pump recess 167 formed therein, as shown in FIGS. 5 and 9. This pump recess 167 includes an eccentric-cam recess 168 and two cylinder recesses 169. The eccentric-cam recess 168 is provided for receiving the eccentric cam portion of the pump device 50, which serves as the drive-force transmitting portion. The two cylinder recesses 169 are provided for receiving the respective two pistons of the pump 54.

As shown in FIG. 9, the eccentric-cam recess 168 is open in the second surface 154, while the two cylinder recesses 160 are open in the respective fifth and sixth surfaces 170, 171 (parallel to the YZ plane) which are parallel to each other.

The pump 54 is mounted on the fifth and sixth surfaces 170, 171 such that the two pistons are received in the respective cylinder recesses 169, while the motor 56 is mounted on the second surface 154 such that the eccentric cam portion connected to the motor 56 is received in the eccentric-cam recess 168.

The holder block 150 further has two discharge passages 172 in communication with respective two discharge portions communicating with the two cylinders of the pump 54. The two discharge passages 172 are connected to a delivery passage 174 through respective connecting passages 173, so that the fluid masses pressurized in the two cylinders merge with each other into a single mass of the pressurized fluid, which is fed into the accumulator 52. This arrangement is effective to minimize pressure pulsation of the pressurized fluid delivered from the pump 54.

The holder block 150 further has a suction passage 176 in communication with the suction side of the pump 54, that is, with the eccentric-cam recess 168, as shown in FIGS. 5 and 8. The suction passage 176 is held in communication with the master reservoir 26 through the port 66.

The suction passage 176 and delivery passage 174 are formed so as to extend in the Y-axis direction, in parallel with each other, in an almost central part of the holder block 150 as seen in the X-axis direction. The discharge passages 172 are also formed so as to extend in the Y-axis direction.

Figure 10:
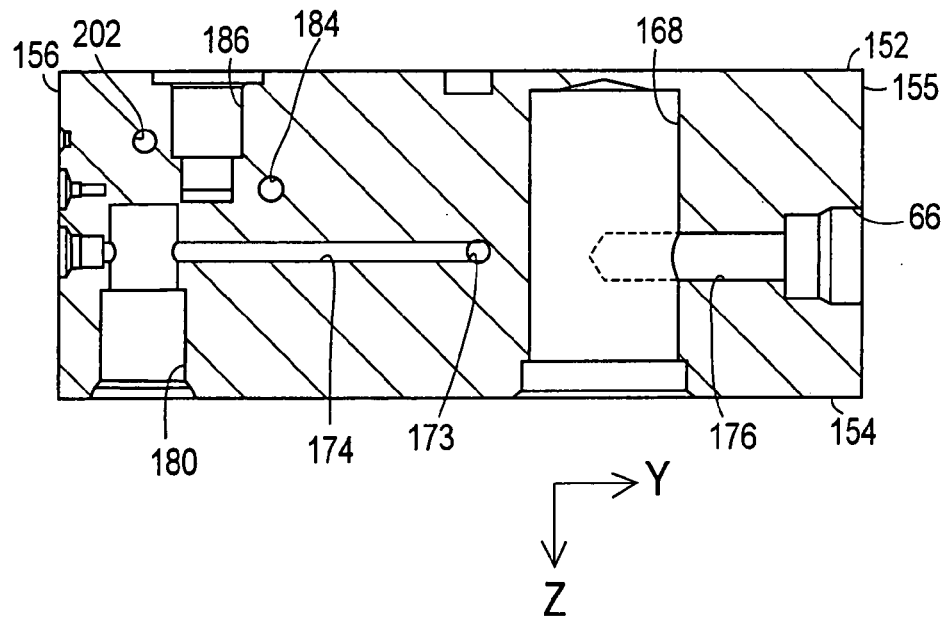
FIG. 10 is a cross sectional view of the pressure control unit taken along line 10-10 of FIG. 5.
Figure 11:
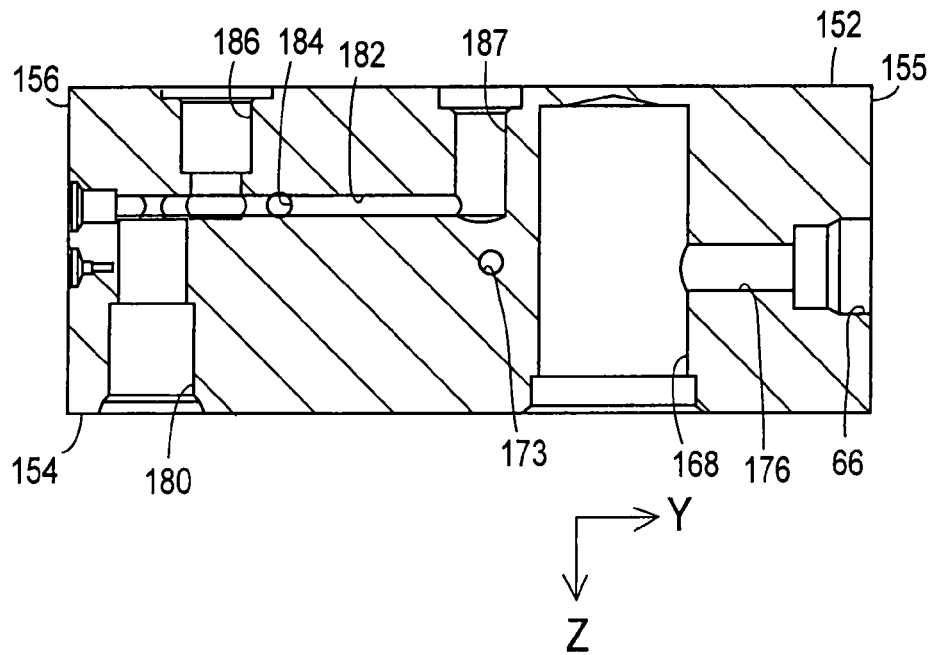
FIG. 11 is a cross sectional view of the pressure control unit taken along line 11-11 of FIG. 5.

Reference numeral 180 denotes an accumulator recess 180 formed to be open in the second surface 154. As shown in FIG. 10, the intermediate port 78 of the accumulator 52 attached in the accumulator recess 180 is held in communication with the delivery passage 174, and while the inner port 77 of the accumulator 52 is held in communication with a supply passage 182, as shown in FIG. 11. The holder block 150 further has a pressure increasing passage 184 formed so as to intersect the supply passage 182 substantially at right angles. The pressure increasing linear control valves 84 are connected to the pressure increasing passage 184. The supply passage 182 is formed in parallel with the delivery passage 174 and in alignment with the delivery passage 174 in the X-axis direction, such that these passages 182, 174 are spaced from each other in the Z-axis direction. Thus, the supply passage 182 is also located at the almost central part of the holder block 150 as seen in the X-axis direction. The pressure increasing passage 184 is formed so as to extend in the X-axis direction.

The holder block 150 further has a relief-valve recess 186 and an accumulator-pressure sensor recess 187, which are open in the first surface 152. The pressure relief valve 64 and the accumulator pressure sensor 62 are attached at the respective recesses 186, 187 open in the first surface 152.

The holder block 150 also have four pressure increasing valve recesses 188 formed in communication with the pressure increasing passage 184. These recesses 188 are spaced apart from each other by suitable distances along the pressure increasing passage 184, as shown in FIG. 5.

Figure 6:
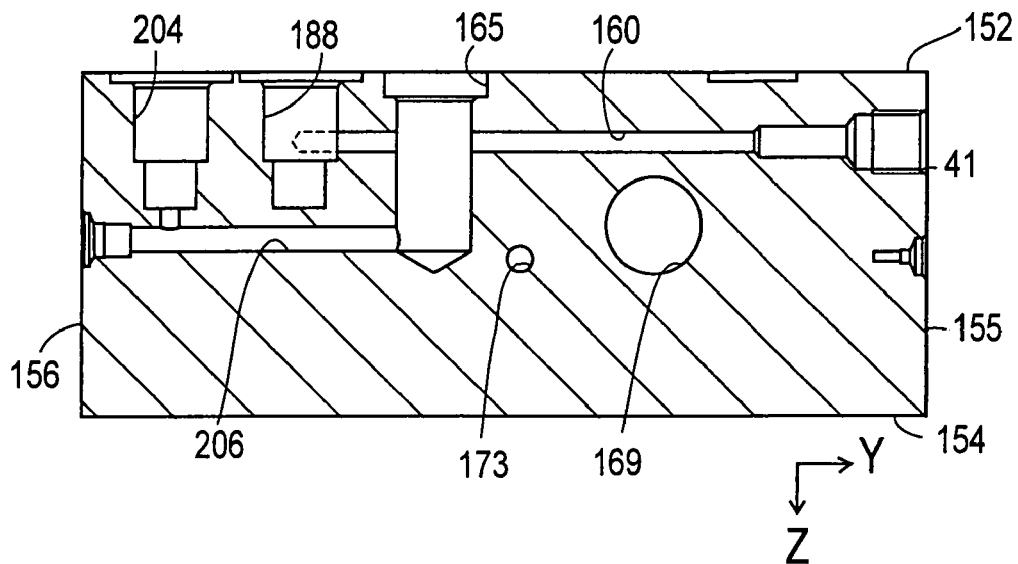
FIG. 6 is a cross sectional view of the pressure control unit taken along line 6-6 of FIG. 5.
Figure 7:
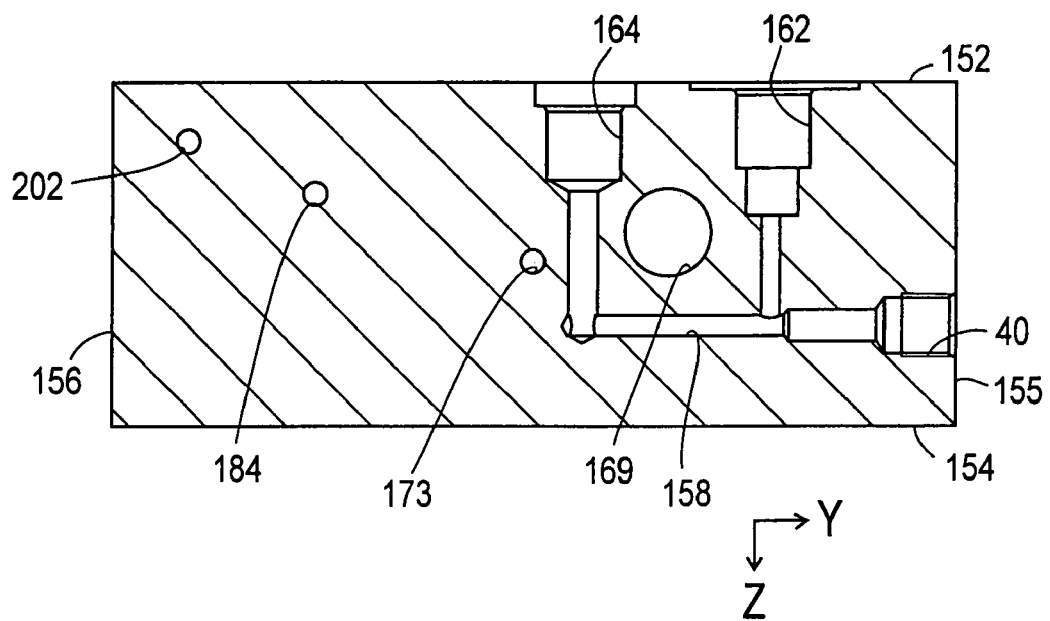
FIG. 7 is a cross sectional view of the pressure control unit taken along line 7-7 of FIG. 5.
Figure 12:
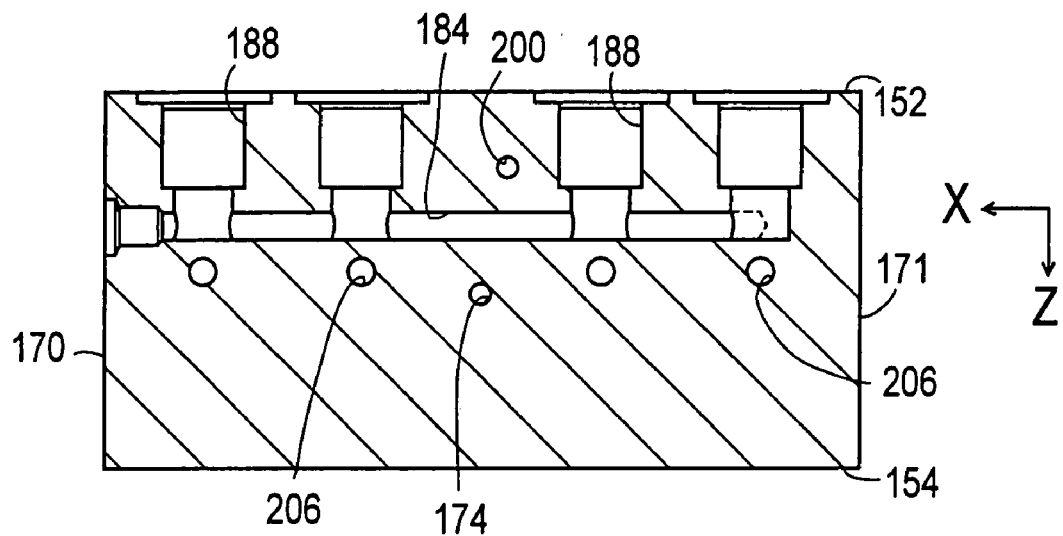
FIG. 12 is a cross sectional view of the pressure control unit taken along line 12-12 of FIG. 5.
Figure 13:
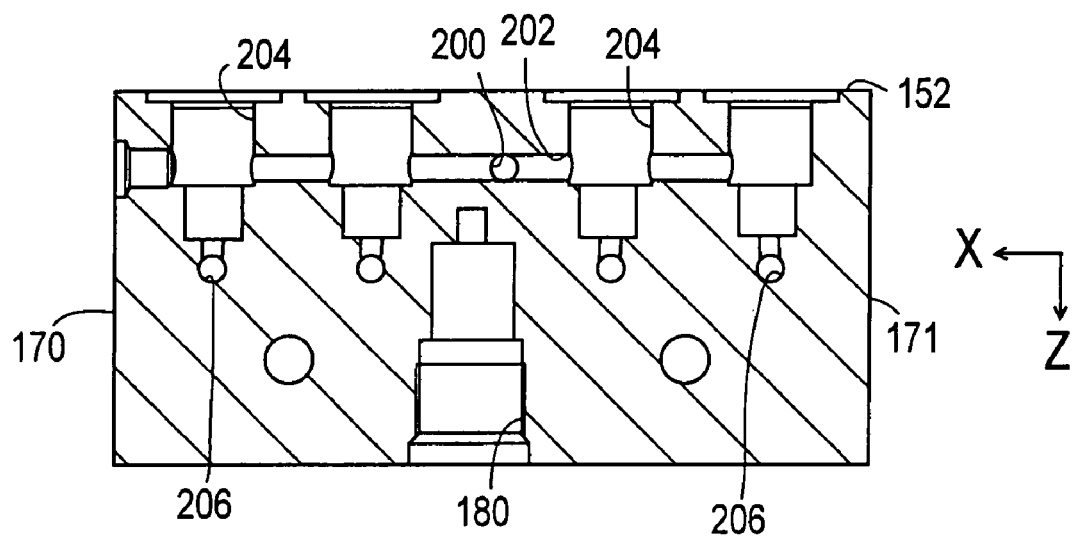
FIG. 13 is a cross sectional view of the pressure control unit taken along line 13-13 of FIG. 5.

As shown in FIGS. 6 and 12, the high pressure port 94 of each pressure increasing linear control valve 84 attached at the corresponding pressure increasing valve recess 188 is held in communication with the pressure increasing passage 184, while the low pressure port 96 of the valve 84 is held in communication with the corresponding brake cylinder passage 160, 166. In the present embodiment, each pressure increasing linear control valve 84 is attached at the corresponding recess 188 such that the linear control valve 84 is held in communication with the supply passage 182 through the pressure increasing passage 184, so that the pressurized fluid in the supply passage 182 is supplied to the high pressure port 94 of the valve 84 through the pressure increasing passage 184.

In the present embodiment, the supply passage 182, pressure increasing passage 184 and brake cylinder passage 166 (160) constitute the fluid passage 88. The supply passage 182 and the pressure increasing passage 184 are provided commonly for the four wheel brake cylinders 22, 24, while the four brake cylinder passages 160, 166 are provided for the respective four wheel brake cylinders 22, 24. The brake cylinder passages 160 constitute the above-indicated third portion of the fluid passages 32, 34, as well as the fluid passage 88.

Figure 14:
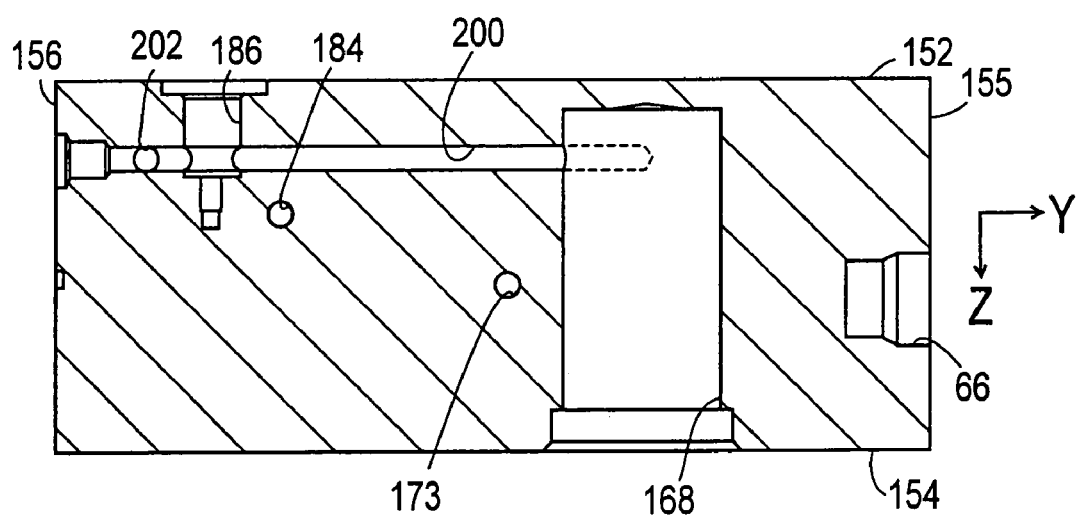
FIG. 14 is a cross sectional view of the pressure control unit taken along line 14-14 of FIG. 5.

The holder block 150 further has a low pressure passage 200 formed in communication with the suction passage 176 through the eccentric-cam recess 168, as shown in FIG. 14. The low pressure passage 200 is formed in parallel with the delivery passage 174 and the supply passage 182, in the almost central part of the holder block 150 as seen in the X-axis direction, such that the low pressure passage 200 is spaced from the passages 174, 182 in the Z-axis direction.

The holder block 150 also has a pressure reducing passage 202 formed so as to intersect the low pressure passage 200 substantially at right angles. The holder block 150 also has four pressure reducing valve recesses 204 open in the first surface 152, such that the recesses 204 are spaced apart from each other by suitable distances along the pressure reducing passage 202. The high pressure port 94 of each pressure reducing linear control valve 86 attached at the corresponding pressure reducing valve recess 204 is held in communication with a communication passage 206 (a part of the brake cylinder passage 160 or 166), while the low pressure port 96 of each valve 86 is held in communication with the pressure reducing passage 202. In this embodiment, the pressure reducing linear control valves 86 are attached at the respective recesses 204 such that each valve 86 is held in communication with the low pressure passage 200 through the pressure reducing passage 202, so that the fluid is discharged from the low pressure port 96 to the reservoir 26 through the pressure reducing passage 202, the low pressure passage 200 and the suction passage 176.

The brake cylinder passages 166 (160), pressure reducing passage 202, low pressure passage 200 and suction passage 176 constitute the fluid passage 89. Like the supply passage 182 and pressure increasing passage 184 described above, the suction passage 176, low pressure passage 200 and pressure reducing passage 202 are provided commonly for the four wheel brake cylinders 22, 24, while the four brake cylinder passages 160, 166 are Z provided for the respective wheel brake cylinders 22, 24.

As described above, the holder block 150 has the plurality of fluid passages and the plurality of mounting recesses. Most of the fluid passages are formed so as to extend in the XY plane, at the same Z-axis position. The fluid passages and the mounting recesses are formed such that the fluid passages are held in communication with the respective ports of the connecting portions of the control valves and accumulator attached at the respective mounting recesses. Accordingly, the required Z-axis positions of the fluid passages are determined by the Z-axis positions of the connecting portions and the depths (Z-axis positions) of the mounting recesses. In other words, the mounting recesses and fluid passages are formed for communication of the fluid passages with the ports of the control valves and accumulator as attached to the recessed portions of the holder block 150.

The above-indicated relief-valve recess 186 is formed between the supply passage 182 and the low pressure passage 200. As described above, the pressure-relief valve 64 is provided to prevent an excessive rise of the delivery pressure of the pump 54, and is therefore required to be located close to the accumulator 52 and pump 54. The low pressure passage 200 is utilized for the pressure-relief valve 64, without the provision of an exclusive low pressure passage 200 for the pressure-relief valve 64. Further, since the accumulator pressure sensor 62 is provided to detect the fluid pressure in the supply passage 182, the accumulator-pressure sensor recess 187 is required to be formed so as to avoid an interference with the low pressure passage 200.

In the holder block 150, the low pressure passage 200, supply passage 182, relief-valve recess 186 and accumulator pressure sensor 187 are formed, so as to meet the requirements described above, namely, such that the supply passage 182 is held in communication with the inner high pressure port of the pressure-relief valve 64 attached at the relief-valve recess 186, and is located as close as possible to the accumulator-pressure sensor recess 187, while the low pressure passage 200 is held in communication with the intermediate low pressure port of the pressure-relief valve 64, and is located as far as possible from the accumulator-pressure sensor recess 187. Therefore, the low pressure passage 200 is spaced apart from the supply passage 182 in the X-axis direction, such that the passage 200 is located as far as possible from the accumulator-pressure sensor recess 187. In this arrangement, the pressure-relief valve 64 can be located between the supply passage 182 and the low pressure passage 200, without having to provide an extra fluid passage, and so as to avoid a problem that the accumulator pressure sensor 62 attached in communication with the supply passage 182 interferes with the low pressure passage 200 and the pressure-relief valve 64. Accordingly, the number of the required fluid passages can be reduced, leading to a reduced size of the unit 10.

In the present embodiment, the brake cylinder passages 160, 166 are formed so as to extend in parallel with each other, and these brake cylinder passages 160, 166, delivery passage 174, low pressure passage 200, supply passage 182 and suction passage 176 are formed in parallel with each other, as shown in FIG. 5. Further, the pressure increasing passage 184 and the pressure reducing passage 202 are formed so as to extend in the direction perpendicular to the supply passage 182 and the low pressure passage 200, and the pressure increasing linear control valves 84 are arranged along the pressure increasing passage 184 while the pressure reducing linear control valves 86 are arranged along the pressure reducing passage 202. Thus, the four pressure increasing linear control valves 84 and the four pressure reducing linear control valves 86, which are provided for the respective four wheel brake cylinders 22, 24, are arranged in a rectangular lattice pattern, such that four straight lines passing the axes of the respective sets of control valves 84, 86 are parallel to each other. In addition, since the brake cylinder passages 160, 166 are parallel to each other, four lines passing the axes of the respective sets of control valves 84, 86 and brake cylinder pressure sensors 122 are almost parallel to each other.

The row of four pressure increasing linear control valves 84 and the row of four pressure reducing linear control valves 86 are parallel to each other.

Thus, the various electromagnetically operated control valves and the various pressure sensors are arranged in a considerably integrated fashion, so as to effectively reduce the required size of the unit 10 or holder block 150.

Further, the delivery passage 174, low pressure passage 200 and supply passage 182 are located at an almost central part of the holder block 150 as seen in the X-axis direction, so that the two sets of pressure increasing and pressure reducing linear control valves 84, 86 can be disposed on either each of the opposite sides of the delivery, low pressure and supply passages 174, 200, 182. Accordingly, the required length of the fluid passages 88, 89 connected to the wheel brake cylinders 22, 24 can be reduced.

In the present embodiment, at least one of the delivery passage 174 and the supply passage 182 constitutes a high pressure passage.

Further, the ports 77 and 78 of the connecting portion 72 of the accumulator 52 are spaced apart from each other in the axial direction of the accumulator 52. The accumulator recess 180, pressure increasing valve recesses 188, delivery passage 174, supply passage 182 and pressure increasing passage 184 are required to be formed such that the delivery passage is communicated with the port 78, and the supply passage 182 is communicated with the port 77, while the pressure increasing passage 184 perpendicular to the supply passage 182 is communicated with the high pressure port 94 of each pressure increasing linear control valve 84. With the recesses 188, 188 and passages 174, 182, 184 being thus formed to meet the above-indicated requirement, the amount of projection of the accumulator 52 from the second surface 154 (which amount corresponds to the amount of projection of the eccentric cam portion of the motor 56 from the second surface 154), and the amount of projection of each pressure increasing linear control valve 84 from the first surface 152 are determined. In other words, the amounts of projection of the pressure increasing linear control valves 84 and the accumulator 52 change depending upon whether the two ports 77, 78 of the connecting portion 72 of the accumulator 52 are axially spaced apart from each other as in the present embodiment, or not. The axially spaced-apart relationship of the two ports 77, 78 can reduce a difference between the amounts of projection of the control valves 84 and the accumulator 52.

Reference numeral 250 in FIG. 5 denotes openings which are provided to define fluid passages and which are closed by plugs.

The unit 10 is controlled by a hydraulic pressure control device 300, which is principally constituted by a computer. The hydraulic pressure control device 300 includes a CPU 302, a ROM 304, a RAM 306 and in input-output portion 308. To the input-output portion 308, there are connected the pressure sensors 62, 120, 122, the coils of the electromagnetically operated control valves 80, 82, 84, 86 and the motor 56.

Since the unit 10 incorporates the power operated hydraulic pressure source 12, the hydraulic pressure control device 300 controls only the unit 10. Further, the control valves 80, 82, 84, 86 and the pressure sensors 62, 120, 122 are mounted on the same surface of the holder block 150, the lead wires of these control valves and pressure sensors can be comparatively easily bundled together.

The unit 10 according to the present first embodiment includes the pressure increasing linear control valves 84 and the pressure reducing linear control valves 86. These linear control valves may be replaced by shut-off valves that are simply opened and closed to control the hydraulic braking pressures in the wheel brake cylinders. While the plunger pump 54 is used in the first embodiment, a gear pump may be used in the pump device. Further, the principle of the invention is applicable to any braking system other than the braking system described above, for example, to a braking system wherein each of two pressurizing chambers of the master cylinder 20 is connected to two brake cylinders. While the accumulator 52 of bellows type is used in the first embodiment, the unit 10 may include an accumulator of bladder type in which the partition member is formed of a flexible material such as a rubber material, or an accumulator of piston type in which the partition member is a piston.

In the embodiment described above, the holder block 150 of the unit 10 is attached at its fourth surface 156 to the vehicle body. However, the holder block 150 may be attached to the vehicle body, at its fifth surface 170 or sixth surface 171, or at two or three surfaces selected from the fourth, fifth and sixth surfaces 156, 170, 171. The shape of the holder block 150 is not limited to that in the illustrated embodiment. Further, the stroke simulator device 140 and other hydraulic components may be attached to the holder block 150, as well as the valves 64, 80, 82, 84, 86, pressure sensors 62, 120, 122 and power operated hydraulic pressure source 12.

Figure 15:
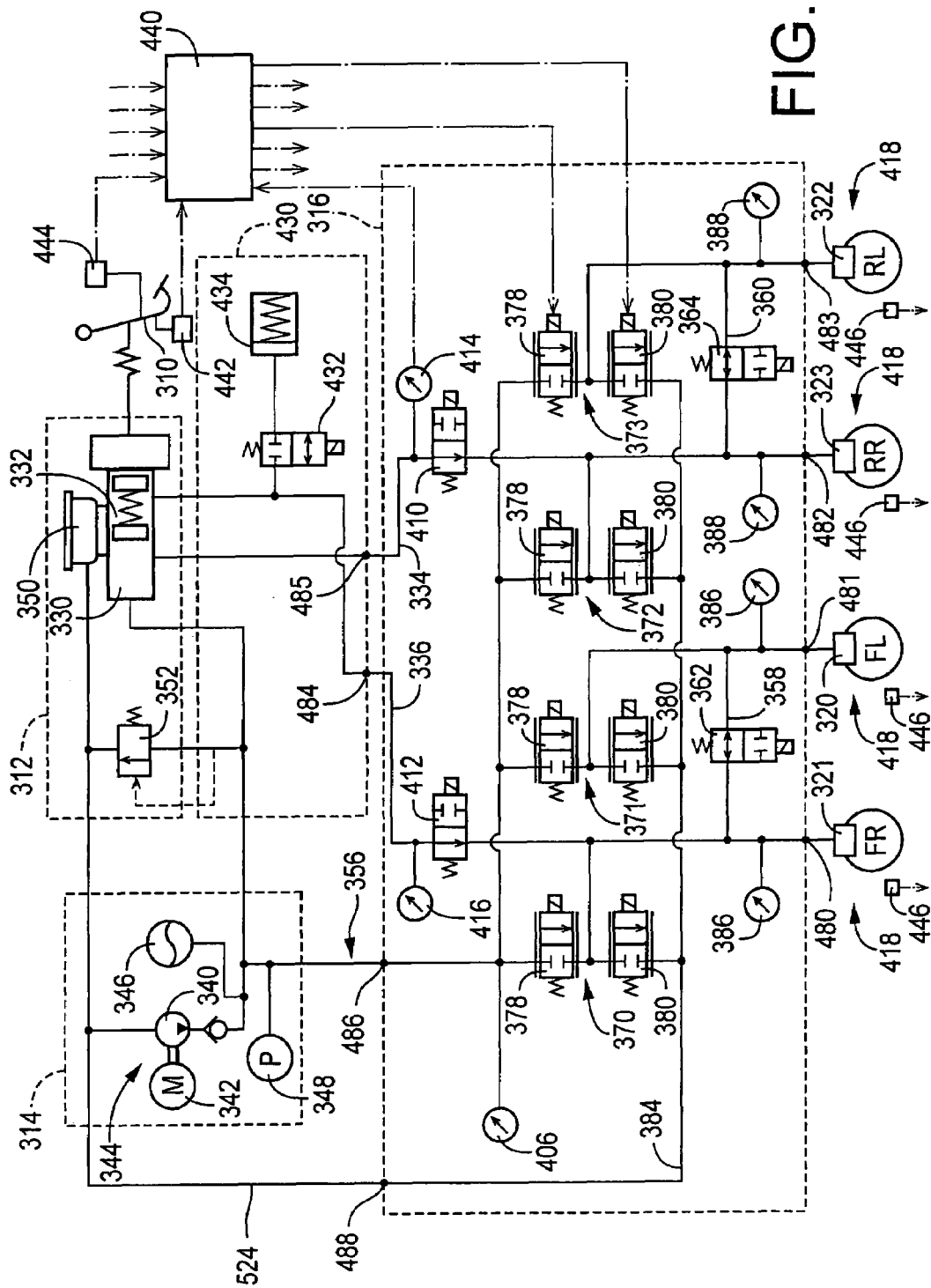
FIG. 15 is a circuit diagram of a braking system including a hydraulic braking pressure control unit constructed according to another embodiment of this invention.

Referring next to FIGS. 15-21, there will be described a second embodiment of this invention. In FIG. 15, reference numeral 310 denotes a brake pedal serving as a brake operating member, and reference numeral 312 denotes a master cylinder equipped with a hydraulic booster, which is arranged to deliver a pressurized working fluid, upon operation of the brake pedal 310 by the operator of an automotive vehicle. Further, reference numeral 314 denotes a power operated hydraulic pressure source arranged to deliver a pressurized fluid, when the hydraulic pressure source is supplied with an electric energy. Reference numeral 316 denotes a hydraulic braking pressure control unit constructed according to the second embodiment of the invention and capable of controlling hydraulic braking pressures in brake cylinders 320, 321 for front left and right wheels FL, FR and brake cylinders 322, 323 for rear left and right wheels RL, RR, by utilizing the pressurized fluid delivered from the power operated hydraulic pressure source 314.

The master cylinder 312 with the hydraulic booster (hereinafter referred to as "master cylinder 312") includes a hydraulic booster portion 330 and a master cylinder portion 332. The hydraulic booster portion 330 is arranged to receive the pressurized fluid received from the power operated hydraulic pressure source 314, for generating a fluid pressure corresponding to a boosted operating force of the brake pedal 310. The master cylinder portion 332 has pressurizing pistons and is arranged to deliver a pressurized fluid the pressure of which corresponds to a braking force applied to the pressurizing pistons, as boosted by the fluid pressure generated by the hydraulic booster portion 330.

To the hydraulic booster 330, there is connected through a fluid passage 334 the rear right wheel brake cylinder 323. To the master cylinder portion 332, there is connected through a fluid passage 336 the front right wheel brake cylinder 321. The master cylinder portion 332 is capable of generating a fluid pressure corresponding to the operating force of the brake pedal 310, even in the event of occurrence of any abnormality or defect of the power operated hydraulic pressure source 314.

The power operated hydraulic pressure source 314 includes a pump device 344, an accumulator 346 and an accumulator pressure sensor 348. The pump device 344 includes a pump 340, and a pump motor 342 to drive the pump 340. The pump 40 is arranged to pressurize the working fluid received from a reservoir 350, and the pressurized fluid delivered from the pump 340 is stored or accommodated in the accumulator 346. The accumulator 346 is constructed as shown in FIG. 2. The pump motor 342 is controlled such that the pressure of the fluid stored in the accumulator 348, that is, the fluid pressure as detected by the accumulator pressure sensor 348 is held within a predetermined range. Between the reservoir 350 and the delivery port of the pump 340, there is provided a pressure relief valve 352, for preventing an excessive rise of the pressure of the pressurized fluid delivered from the pump 340.

To the power operated hydraulic pressure source 314, there are connected through a high pressure passage 356 the brake cylinders 320-323 for the front left and right wheels FL, FR and rear left and right wheels RL, RR. In the present second embodiment, all of the four wheel brake cylinders 320-323 are connected to the power operated hydraulic pressure source 314, while the front and rear right wheel cylinders 321, 323 are connected to the master cylinder 312. Further, the front left and right wheel brake cylinders 320, 321 are connected to each other by a connecting passage 358, while the rear left and right wheel brake cylinders 322, 323 are connected to each other by a connecting passage 360. The connecting passages 358, 360 are provided with respective communication control valves 362, 364, which are normally open valves to be held open when no electric currents are applied thereto. The front left and right wheel brake cylinders 320, 321 are held in communication with each other while the communication control valve 362 is in the open state, and are isolated from each other while the valve 362 is in the closed state. Similarly, the rear left and right wheel brake cylinders 322, 323 are held in communication with each other while the communication control valve 364 is in the open state, and are isolated from each other while the valve 364 is in the closed state. Thus, the present braking system has two mutually independent sub-systems one of which includes the front wheel brake cylinders 320, 321 and the other of which includes the rear wheel brake cylinders 322, 323*k*.

Between the power operated hydraulic pressure source 314 and the front left and right wheel brake cylinders 320, 210 and the rear left and right wheel brake cylinders 322, 323, there are disposed respective braking pressure control valve devices 370, 371, 372 and 373. Each of these pressure control valve devices 370-373 includes a pressure increasing control valve 378 and a pressure reducing control valve 380. The pressure increasing control valves 378 are disposed in a high pressure passage 356 between the wheel brake cylinders 320-323 and the power operated hydraulic pressure source 314, while the pressure reducing control valves 380 are disposed in a low pressure passage 384 between the wheel brake cylinders 320-323 and the reservoir 350. Four brake cylinder pressure sensors 386, 388 are provided for the four wheel brake cylinders 320-323, respectively, so that the fluid pressures in the wheel brake cylinders 320, 321 are detected by the respective pressure sensors 386, while the fluid pressures in the wheel brake cylinders 322, 323 are detected by the respective pressure sensors 388.

The pressure increasing control valves 378 and the pressure reducing control valves 380 are linear control valves identical with the linear control valves 84, 86 which have been described above by reference to FIG. 3. Each pressure increasing control valve 378 is connected at its high pressure port 94 (FIG. 3) to the high pressure passage 356 (power operated hydraulic pressure source 314), and at its low pressure port 96 (FIG. 3) to the corresponding wheel brake cylinder 320, 321, 322, 323. A fluid pressure difference across the pressure increasing control valve 378 is obtained as a difference between a fluid pressure detected by a pressure sensor 406 connected to a portion of the high pressure passage 356 between the control valve 378 and the accumulator 346, and a fluid pressure detected by the brake cylinder pressure sensor 386, 688. Although the pressure sensor 406 is provided to detect the output pressure of the power operated hydraulic pressure source 314, this pressure sensor 406 is located nearer to the control valve 378 than the accumulator pressure sensor 348, so that the fluid pressure detected by the pressure sensor 406 is less influenced by a pressure loss in the high pressure passage 356. Accordingly, the pressure sensor 406 permits a higher degree of detection of the above-indication fluid pressure difference, in cooperation with the brake cylinder pressure sensor 386, 388, than the accumulator pressure sensor 348. By the pressure increasing control valve 378, it is possible to control the difference between the output pressure of the power operated hydraulic pressure source 314 and the fluid pressure in the wheel brake cylinder 320-323, so that the hydraulic braking pressure in the corresponding wheel brake cylinder can be increased.

Each pressure reducing control valve 380 is connected at its high pressure port 94 to the corresponding wheel brake cylinder 320-323, and at its low pressure port 96 to the reservoir 350 (low pressure passage 384). Since the fluid pressure in the reservoir 350 can be considered to be substantially equal to the atmospheric pressure, the fluid pressure difference across the control valve 380 can be represented by the fluid pressure as detected by the corresponding brake cylinder pressure sensor 386, 388. By controlling the pressure reducing control valve 380, it is possible to control the difference between the fluid pressures in the wheel brake cylinder 320-323 and the reservoir 350, so that the hydraulic braking pressure in the corresponding wheel brake cylinder can be reduced.

The fluid passages 334, 336 are provided with respective master cylinder cut-off valves 410, 412 and respective master cylinder pressure sensors 414, 416. Like the pressure increasing control valves 378 and the pressure reducing valves 380, each master cylinder cut-off valve 410, 412 has two ports which are axially spaced apart from each other. However, the valve member of the master cylinder cut-off valve 410, 412 is biased by a spring in a direction that causes the valve member to be moved away from the valve seat.

In the above-indicated arrangement of the master cylinder cut-off valves 410, 412, the seating valve is held open maintaining fluid communication between the two ports while no electric current is applied to the solenoid coil. The seating valve is selectively opened and closed by selective application and removal of an electric current to and from the solenoid coil, whereby the two ports are selectively communicated with and isolated from each other.

While the fluid pressures in the wheel brake cylinders 320-323 are controlled by controlling the pressurized fluid delivered from the power operated hydraulic pressure source 314, the master cylinder cut-off valves 410, 412 are held in the closed state, to isolate the wheel brake cylinders 320-323 from the master cylinder 312. While the master cylinder cut-off valves 410, 412 and the communication control valves 362, 364 are open, the pressurized fluid delivered from the master cylinder 312 is supplied to all of the wheel brake cylinders 320-323 to activate respective hydraulic brakes 418.

It will be understood that the pressure increasing control valves 378, pressure reducing control valves 380, communication control valves 362, 364, master cylinder cut-off valves 410, 412, brake cylinder pressure sensors 386, 388, master cylinder pressure sensors 414, 416 and pressure sensor 406 are hydraulic pressure control components of the hydraulic braking pressure control unit 316, which are held by a single holder structure in the form of a holder block 420 which will be described.

The fluid passage 336 is also provided with a stroke simulator device 430, which includes a simulator control valve 432 and a stroke simulator 434. The simulator control valve 432 is selectively opened and closed by selective application and removal of an electric current to and from a coil. The simulator control valve 432 is held in the open state while the fluid pressures in the wheel brake cylinders 320-323 are controlled by utilizing the pressurized fluid delivered from the power operated hydraulic pressure source 314, with the master cylinder cut-off valves 410, 412 held in the closed state. While the master cylinder cut-off valves 410, 412 are held open, the simulator control valve 432 is held in the closed state, to prevent wasting of the pressurized fluid delivered from the master cylinder 312.

The braking system includes an electronic control device 440 (hereinafter abbreviated as "ECU 440"). The ECU 440 is principally constituted by a computer incorporating a CPU, a RAM, a ROM and an input-output portion, as described above with respect to the hydraulic pressure control device 300 provided in the first embodiment. To the input-output portion, there are connected the accumulator pressure sensor 348, the brake cylinder pressure sensors 386, 388, pressure sensor 406 and master cylinder pressure sensors 414 416, which have been described. To the input-out portion, there are also connected an operation force sensor 442 arranged to detect an operating force acting on the brake pedal 310, a stroke sensor 444 arranged to detect an operating stroke of the brake pedal 310, and wheel speed sensors 446 arranged to detect the rotating speeds of the front and rear wheels FL, FR, RL, RR. To the input-output portions, there are further connected through respective driver circuits (not shown) the coils of the pump motor 342, communication control valves 363, 364, pressure increasing control valves 478, pressure reducing control valves 380 and master cylinder cut-off valves 410, 412. The various control valves described above are controlled to control the hydraulic braking pressures in the wheel brake cylinders 320-323, o the basis of the output signals of the various sensors, such as the pressure sensors indicated above.

For instance, the present braking system is controlled such that the detected actual fluid pressures in the wheel brake cylinders 320-323 coincide with a value corresponding to a target vehicle braking force as desired by the vehicle operator, which target vehicle braking force is obtained on the basis of the output signals of the stroke sensor 444 and the master cylinder pressure sensors 414, 416. The target vehicle braking force may be obtained on the basis of the output signals of the operation force sensor 442 and stroke sensor 444. Where a vehicle drive system of the vehicle includes an electric motor, the present braking system may be arranged such that the hydraulic brakes 418 cooperate with the electric motor to perform a cooperative braking control in which a hydraulic braking force produced by the brakes 418 is controlled such that a sum of this hydraulic braking force and a regenerative braking force produced by the electric motor coincides with the target vehicle braking force as desired by the vehicle operator.

Figure 20:
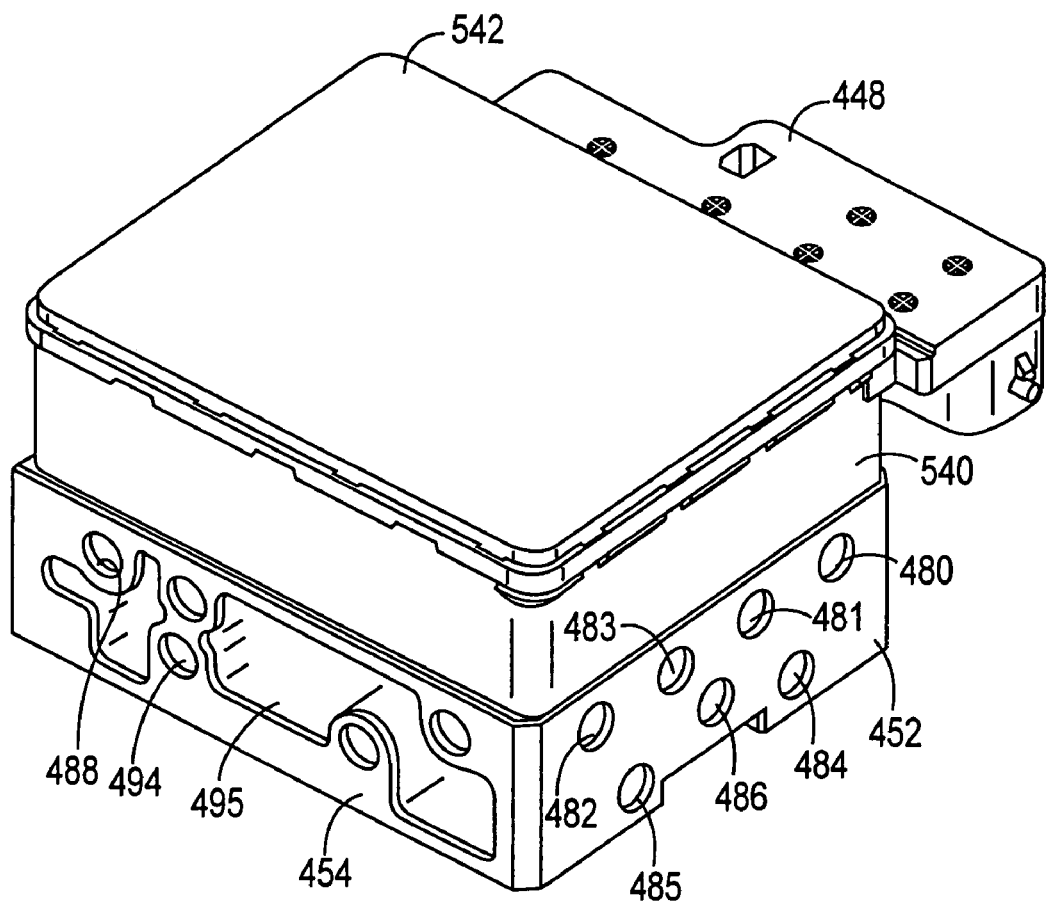
FIG. 20 is a perspective view of the pressure control unit of FIG. 16.

Power supply wires and signal wires of the solenoid-operated control valves, sensors and other hydraulic pressure control components which are held by the holder block 420 are connected to the ECU 440 and batteries, through electrical wiring members such as connectors disposed within a box 448 shown in FIG. 20. The ECU 440 may be housed within the box 448.

Figure 21:
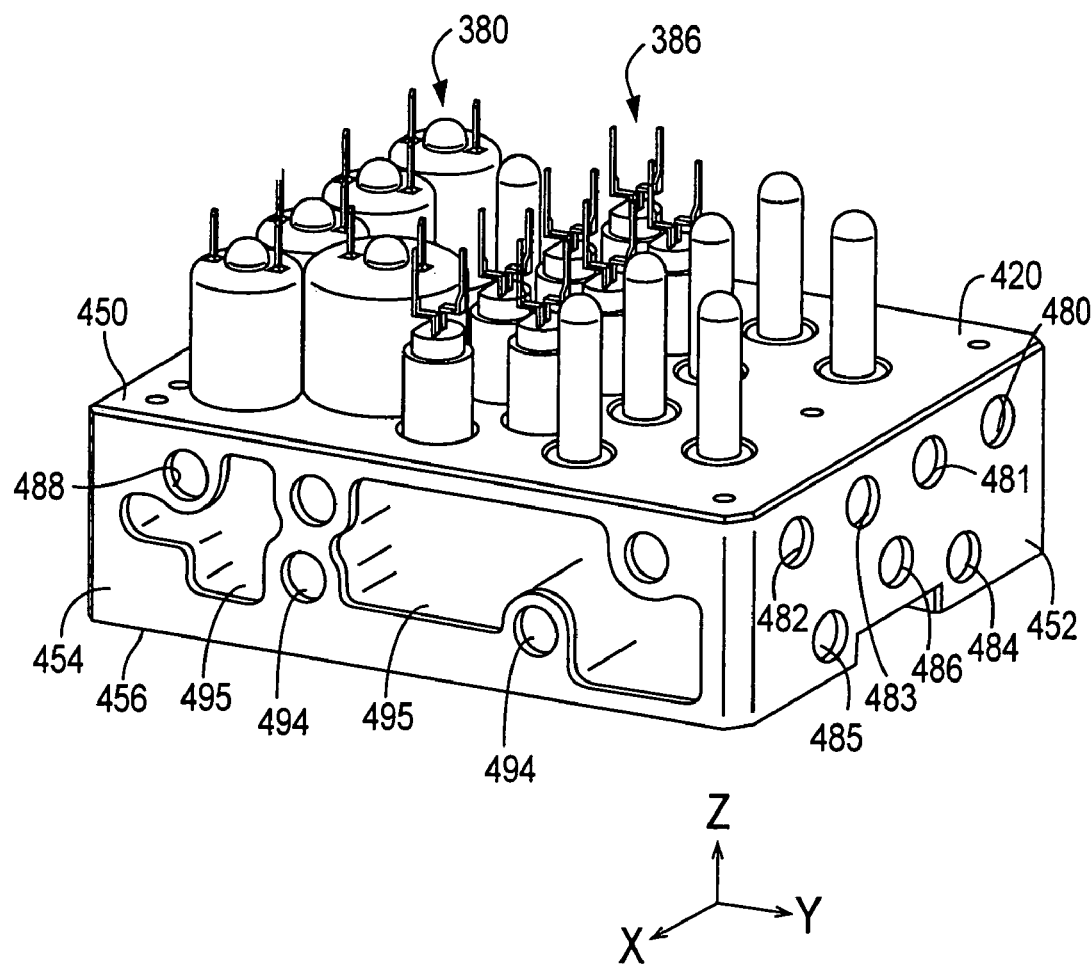
FIG. 21 is a perspective view of the pressure control unit of FIG. 16.

In the hydraulic braking pressure control unit 316, the holder block 420 is a generally rectangular parallelepiped having six surfaces that are generally rectangular, as shown in FIGS. 20 and 21. Namely, the holder block 420 has a first surface 450 (parallel to an XY plane), in which there are formed mounting recesses (which will be described) for attaching the pressure increasing control valves 378, brake cylinder pressure sensors 386 and other hydraulic components. The holder block 420 further has a second surface 452 (parallel to an XZ plane), which is adjacent and perpendicular to the first surface 450. In the second surface 452, there are formed connecting ports (which will be described) for connection to the various fluid passages (connecting pipes, hoses, etc.) which extend from the master cylinder 312, power operated hydraulic pressure source 314 and wheel brake cylinders 320-323. The holder block 420 further has a third surface 454 (parallel to a YZ plane), which is adjacent and perpendicular to the first and second surfaces 450, 452. In the third surface 454, there is formed a connecting port (which will be described) for connection to the fluid passage (pie or hose) which extends from the reservoir 350. The holder block 420 further has a fourth surface 456 which is parallel and opposite to the first surface 450. The holder block 420 is fixed at this fourth surface 456 to a suitable member of the vehicle body. The holder block 420 includes side portions respectively having the first through fourth surfaces 450, 452, 454, 456.

Figure 16:
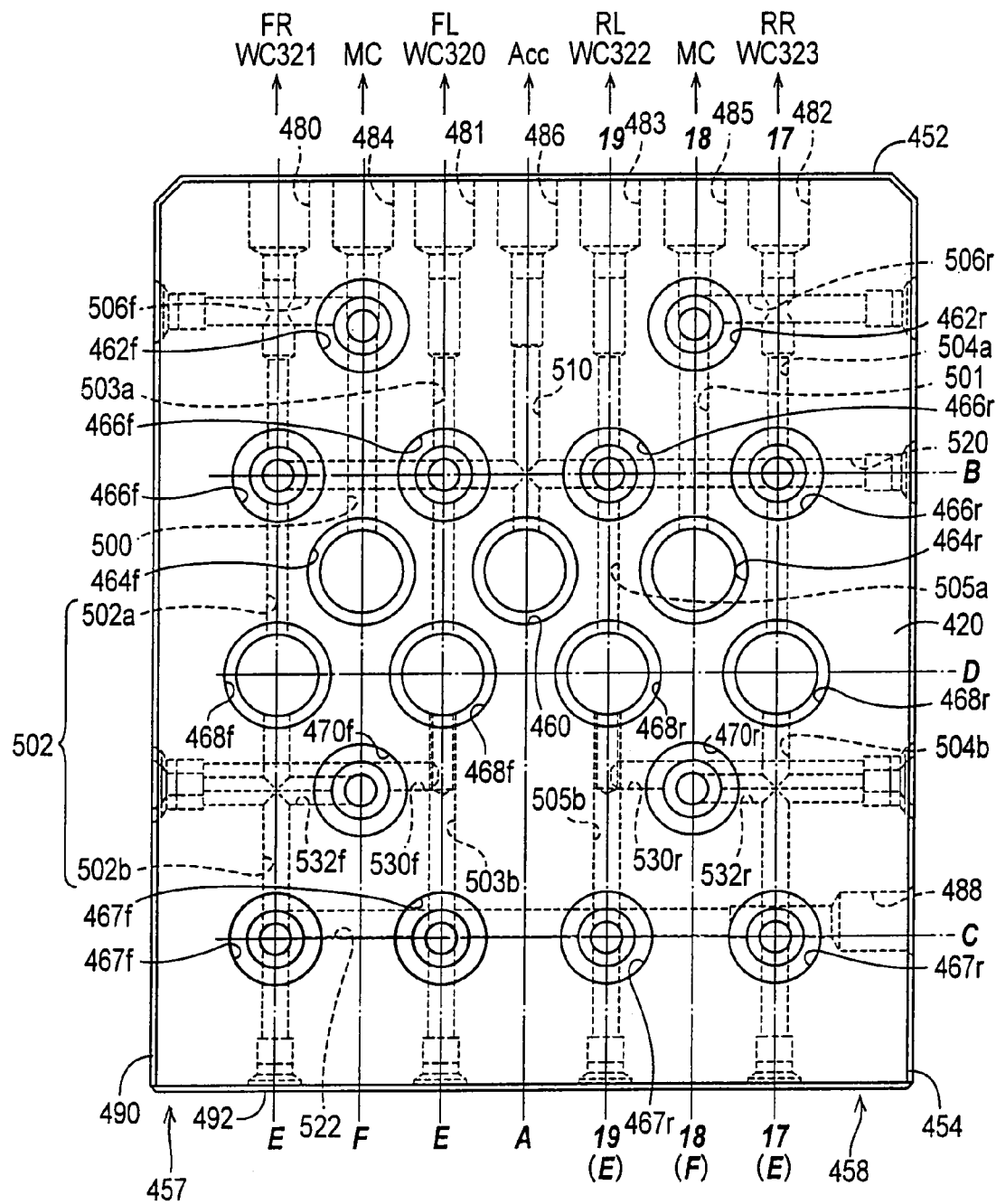
FIG. 16 is a plan view of the hydraulic braking pressure control unit of FIG. 15.

As shown in FIG. 16, the holder block 420 consists of a front-braking half 457 and a rear-braking half 458 located on the respective opposite sides of a bisector plane which includes a bisector line A and which is perpendicular to the first surface 450 and parallel to the YZ plane. The bisector line A bisects the X-axis dimension of the holder block 420 and extends in the Y-axis direction. The hydraulic pressure control components and fluid passages of the hydraulic braking pressure control unit 316, which are provided for the front wheel brake cylinders 420, 421, are attached to and formed within the front-braking half 457, while the hydraulic components and fluid passages provided for the rear wheel brake cylinders 422, 423 are attached to and formed within the rear-braking half 458. In the holder block 420, the mounting recesses for attaching the hydraulic components and the fluid passages for the front wheel brake cylinders 320, 321 and those for the rear wheel brake cylinders 322, 323 are formed symmetrically with each other, with respect to the bisector plane which includes the bisector line A and which is parallel to the YZ plane.

In the holder block 420, a pressure sensor recess 460 for attaching the pressure sensor 406 is formed in a central portion of the first surface 450 through which the bisector line A passes. In a half of the first surface 450 which corresponds to the front-braking half 457, there are formed mounting recesses for attaching the hydraulic components for the front wheel brake cylinders 420, 421, that is: a master cylinder cut-off valve recess 462f for attaching the master cylinder cut-off valve 412; a master cylinder pressure sensor recess 464f for attaching the master cylinder pressure sensor 416; two pressure increasing valve recesses 466f for attaching the respective two pressure increasing control valves 378 for the front left and right wheel brake cylinders 320, 321; two pressure reducing valve recesses 467f for attaching the respective two pressure reducing control valves 480 for the front left and right wheel brake cylinders 320, 321; two brake cylinder pressure sensor recesses 468f for attaching the respective two front brake cylinder pressure sensors 386; and a communication-valve recess 470f for attaching the communication control valve 362 for the front wheel brake cylinders 320, 321.

In a half of the first surface 450 which corresponds to the rear-braking half 458, there are formed mounting recesses for attaching the hydraulic components for the front wheel brake cylinders 422, 423, that is: a master cylinder cut-off valve recess 462r for attaching the master cylinder cut-off valve 410; a master cylinder pressure sensor recess 464r for attaching the master cylinder pressure sensor 414; two pressure increasing valve recesses 466r for attaching the respective two pressure increasing control valves 378 for the rear left and right wheel brake cylinders 322, 323; two pressure reducing valve recesses 467r for attaching the respective two pressure reducing control valves 480 for the rear left and right wheel brake cylinders 322, 323; two brake cylinder pressure sensor recesses 468r for attaching the respective two rear brake cylinder pressure sensors 386; and a communication-valve recess 470r for attaching the communication control valve 364 for the rear wheel brake cylinders 322, 323.

These mounting recesses 460, 462f, 462r, 464f, 464r, 466f-468f, 466r-468r, 470f, 470r are formed in the first surface 420 parallel to the XY plane, in the Z-axis direction, that is, in a direction substantially perpendicular to the XY plane. The appropriate hydraulic pressure control components are attached to the holder block 420 such that the axes of the hydraulic components are substantially perpendicular to the XY plane (first surface 450), with the end portions of the hydraulic components projecting from the first surface 450, as shown in FIG. 21.

There will be described positional relationships among the mounting recesses for the respective hydraulic components. It will be understood that the hydraulic components attached at the mounting recesses have the same positional relationships as those of the mounting recesses.

In the present second embodiment, too, the four pressure increasing valve recesses 466f, 466r are arranged along a straight line B, and the four pressure reducing valve recesses 467f, 467r are arranged along a straight line C, while the four brake cylinder pressure sensor recesses 468f, 468r are arranged along a straight line D. These straight lines B, C and D are parallel to the X-axis direction, and are spaced apart from each other in the Y-axis direction by suitable distances such that the straight line D is almost intermediate between the straight lines B and C. Further, the pressure increasing valve recess 466f, 466r, brake cylinder pressure sensor recess 468f, 468r and pressure reducing valve recess 467f, 467r which are provided for each of the four wheel brake cylinders 320-323 are arranged along a corresponding one of four straight lines E which are parallel to the Y-axis direction and which correspond to the respective four wheel brake cylinders 320-323. Thus, the four pressure increasing valve recesses 466f, 466r, pressure reducing valve recesses 467f, 467r and brake cylinder pressure sensor recesses 468f, 468r are arranged in a lattice or grid pattern.

Further, the two master cylinder pressure sensor recesses 464f, 464r and one pressure sensor recess 460 are disposed along a straight line between the straight lines B and D, while the two communication-valve recesses 470f, 470r are disposed between the straight lines D and C. The master cylinder cut-off valve recess 462f, 462r, master cylinder pressure sensor recess 464f, 464r and communication-valve recess 470f, 170r which are provided for each of the front and rear pairs of wheel brake cylinders 320-323 are arranged along a corresponding one of two straight lines F which are parallel to the Y-axis direction and which correspond to the respective two pairs of wheel brake cylinders 320-323.

In the present embodiment, each of the master cylinder pressure sensor recess 464f and the master cylinder cut-off valve recess 162f for the front wheel brake cylinders 320, 321 is spaced from the two pressure increasing valve recesses 166f by a predetermined same distance. Similarly, each of the recesses 464r, 462r for the rear wheel brake cylinders 322, 323 is spaced from the two recesses 466r by a predetermined same distance. Further, the pressure sensor recess 460 is spaced by a predetermined same distance from the intermediate two pressure increasing valve recesses 166f, 166r, one of which is for one of the two front wheel brake cylinders 320, 321 and other of which is for one of the two rear wheel brake cylinders 322, 323.

As described above, the master cylinder pressure sensor recesses 464f, 464r and the pressure sensor recess 460 are located on respective straight lines which are normal to respective straight segments connecting the adjacent pressure increasing valve recesses 466f, 466r and which pass midpoints of the respective straight segments. Thus, the four pressure increasing valve recesses 466f, 466r, the two master cylinder pressure sensor recesses 464f, 464r and the one pressure sensor recess 460 are arranged in a zigzag or staggered pattern. Similarly, the two master cylinder pressure sensor recesses 464f, 464r, the one pressure sensor recess 460 and the four brake cylinder pressure sensor recesses 468f, 468r are arranged in a zigzag or staggered pattern.

Further, the master cylinder pressure sensor recess 464f for the front wheel brake cylinders 320, 321 is located in a substantially central part of a rectangle whose four apexes are defined by the two pressure increasing valve recesses 466f and two brake cylinder pressure sensor recesses 468f for the front wheel brake cylinders 320, 321. Thus, the recess 464f is spaced from the recesses 466f and the recesses 468f, by the same distance.

In addition, the communication-valve recess 470f for the front wheel brake cylinders 320, 321 is located on a straight line which is normal to a straight segment connecting the two brake cylinder pressure sensor recesses 468f and which passes a midpoint of that straight segment. Namely, the recess 470f is located on a straight line which is normal to a straight segment connecting the two pressure reducing valve recesses 467f and which passes a midpoint of that straight segment.

The recesses 464r, 466r, 468r, 467r for the rear wheel brake cylinders 322, 323 are positioned relative to each other in the same manner as described above with respect to the recesses 464f, 466f, 468f, 467f.

As described above, the master cylinder cut-off valve recesses 462 and the master cylinder pressure sensor recesses 464 are disposed on the opposite sides of the straight line B. In this arrangement, the area of the first surface 450 of the holder block 420 is more effectively used than in an arrangement in which the four recesses 462, 464 are disposed on one side of the straight line B, so that the required size of the holder block 420 can be reduced.

In the second surface 452, there are formed four brake cylinder ports 480-483, two master cylinder ports 484, 485 and one pump-device port 486, as shown in FIGS. 20 and 21, such that the master cylinder port 484 is located between the two adjacent brake cylinder ports 480, 481, and the master cylinder port 484 is located between the other two adjacent brake cylinder ports 482, 483, while the pump-device port 486 is located between the two master cylinder ports 484, 485.

Thus, the brake cylinder ports 480-483, master cylinder ports 484, 485 and pump-device port 486 are arranged in a zigzag or staggered pattern, so that the required area of the second surface 452 can be reduced.

In the present arrangement, the front and rear right wheel brake cylinders 321, 323 are connected through hoses or any other connecting means to the respective two brake cylinder ports 480, 482, which are the outer ones of the four ports 480-483 located at the ends of the second surface 452. Thus, the wheel brake cylinders 321, 323 to be connected to the master cylinder 412 are connected to the two outer master cylinder ports 480, 482. The front and rear left wheel brake cylinders 320, 322 are connected through hoses or any other connecting means to the respective two inner brake cylinder ports 481, 483. The master cylinder portion 332 is connected to the master cylinder port 484, while the hydraulic booster portion 330 is connected to the master cylinder portion 485.

In the third surface 454, there is formed a reservoir port 488 connected to the reservoir 350. The third surface 454, a fifth surface 490 opposite to the third surface 454, and a sixth surface 492 opposite to the second surface 452 have openings 494 which are formed to define fluid passages and which are closed by plugs. Reference numeral 495 denotes weight-reducing cutouts provided to reduce the weight of the holder block 420.

The holder block 420 has two master cylinder passages 500, 501 and four brake cylinder passages 502-505, which are formed to extend in the Y-axis direction. Each of the four brake cylinder passages 502-505 consists of a pressure increasing brake cylinder passage 502a-505a and a pressure reducing brake cylinder passage 402b-505b. The master cylinder passages 500, 501 are held in communication with the respective master cylinder ports 484, 485, while the pressure increasing brake cylinder passages 502a-505a are held in communication with the respective brake cylinder ports 480-483.

The master cylinder passage 500 formed in the front-braking half 457 is formed in communication with the master cylinder cut-off valve recess 462f and the master cylinder pressure sensor recess 464f. The master cylinder passage 500 is communicated with an inner port of the master cylinder cut-off valve 412 attached at the master cylinder cut-off valve recess 464f. The front-braking half 457 has a connecting passage 506f formed in communication with an intermediate portion of the master cylinder cut-off valve 412. The connecting passage 506f is formed so as to extend in the X-axis direction, and held in communication with the pressure increasing brake cylinder passage 502a. In the rear-braking half 458, too, the master cylinder passage 501 is communicated with an inner portion of the master cylinder cut-off valve 410 attached at the master cylinder cut-off valve recess 464r. The passage 501 is also held in communication with the master cylinder pressure sensor recess 464r. The master cylinder passage 501 and the pressure increasing brake cylinder passage 504a are held in communication with each other through a connecting passage 506r formed in communication with an intermediate portion of the master cylinder cut-off valve 410.

In the present embodiment, the fluid passage 336 is constituted by the master cylinder passage 500, connecting passage 506f, pressure increasing brake cylinder passage 502a, etc., while the fluid passage 334 is constituted by the master cylinder passage 501, connecting passage 506r, pressure increasing brake cylinder passage 504a, etc.

The pressure increasing brake cylinder passages 502a-505a and the corresponding pressure reducing brake cylinder passages 502b-505 of the brake cylinder passages 502-505 are connected to each other through the brake cylinder pressure sensor recesses 468f, 468r. This aspect will be further described by reference to FIG. 17, with respect to the brake cylinder passage 504 for the rear right wheel brake cylinder 323, by way of example. The following description is true for the other brake cylinder passages 502, 503 and 505.

The pressure increasing brake cylinder passage 504a is held in communication with the pressure increasing valve recess 466r and the brake cylinder pressure sensor recess 468r, while the pressure reducing brake cylinder passage 504b is held in communication with the brake cylinder pressure sensor recess 468r and the pressure reducing valve recess 467r. The pressure increasing brake cylinder passage 504a is communicated with the intermediate or low pressure port 96 of the pressure increasing control valve 378 attached at the pressure increasing valve recess 466r, while the pressure reducing brake cylinder passage 504b is communicated the inner or high pressure port 94 of the pressure reducing control valve 380 attached at the pressure reducing valve recess 467r. The pressure increasing valve recess 466r and the pressure reducing vale recess 467r are formed such that the corresponding pressure increasing and pressure reducing control valves 378, 380 attached at those recesses 466r, 467r project from the first surface 450 by substantially the same distance.

According to the arrangement of connection of the pressure increasing and pressure reducing brake cylinder passages 504a, 504b to the respective pressure increasing and pressure reducing control valves 378, 380, the brake cylinder passages 504a, 504b must be formed at different positions in the Z-axis direction, namely, at different depth positions from the first surface 450. Accordingly, a fluid passage extending in the Z-axis direction would be required to connect these two brake cylinder passages 504a, 504b. In the present arrangement in which the brake cylinder passages 504a, 504b are connected to each other through the corresponding brake cylinder pressure sensor recess 468r, it is not necessary to form such a fluid passage extending in the Z-axis direction, and it is not necessary to close this fluid passage at its open end. Accordingly, the cost of manufacture of the hydraulic braking pressure control unit 416 is reduced.

The brake cylinder pressure sensor 488 is connected to the brake cylinder pressure sensor recess 468r such that a pressure detecting portion of the pressure sensor 488 is located nearer to the first surface 450, than the point of connection between the pressure increasing and pressure reducing brake cylinder passages 504a, 504b. The pressure detecting portion is open to a pressure chamber partially defined by the pressure sensor recess 468r, and the two brake cylinder passages 504a, 504b are both held in communication with this pressure chamber. This arrangement permits the brake cylinder pressure sensor 488 to detect both of an increase and a decrease of the fluid pressure in the rear right wheel brake cylinder 323, in the same manner, and is therefore effective to reduce inconsistency between the pressure increase control and the pressure decrease control.

The holder block 420 has a high pressure passage 510 formed therein so as to extend in the Y-axis direction. The high pressure passage 510 is held in communication with the pump-device port 486 and the pressure sensor recess 460. The high pressure passage 510 is aligned with the bisector line A as seen in a plane parallel to the first surface 450.

In the present second embodiment described above, the master cylinder passages 500, 501, brake cylinder passages 502-505 and high pressure passage 510 are all formed holder block 420, so as to extend in the Y-axis direction in parallel with each other. Thus, those passages are orderly arranged so as to effectively reduce the required sizes of the holder block 420 and the hydraulic braking pressure control unit 416.

On the other hand, a single pressure increasing passage 520 is formed commonly for the four pressure increasing valve recesses 466f, 466r, while a single pressure reducing passage 522 is formed commonly for the four pressure reducing valve recesses 467f, 467r. The pressure increasing passage 520 is formed so as to extend in the X-axis direction and is held in communication with the inner high pressure ports 94 of the pressure increasing control valves 378 attached at the pressure increasing valve recesses 466f, 466r. The pressure increasing passage 520 is held also in communication with the above-indicated high pressure passage 510, for communication with the pump device 344. The pressure increasing passage 520 extends in a direction substantially parallel to the straight line B indicated above. To the intermediate low pressure ports 96 of the pressure increasing control valves 378, there are connected the wheel brake cylinders 320-323 through the respective pressure increasing brake cylinder passages 502a-505a. In the present embodiment, the fluid passage 56 is constituted by the high pressure passage 510, pressure increasing passage 520, brake cylinder passages 502a-505a, etc. The brake cylinder passages 502a, 504a constitute not only parts of the fluid passages 334, 336 but also a part of the fluid passage 356.

The pressure reducing passage 522 is formed in communication with the intermediate low pressure ports 96 of the pressure reducing control valves 380 attached at the pressure reducing valve recesses 467f, 467r, and is connected to the reservoir port 488. To the reservoir port 488, there is connected a reservoir passage 524 communicating with the reservoir 350. To the inner high pressure ports 94 of the pressure reducing control valves 380, there are connected the wheel pressure reducing brake cylinder passages 502b-505b communicating with the wheel brake cylinders 320-323. In the present embodiment, the fluid passage 84 is constituted by the pressure increasing brake cylinder passages 502a-505a, pressure reducing brake cylinder passages 502b-505b, pressure reducing passage 522, reservoir passage 524, etc.

Since the four pressure increasing valve recesses 466f, 466r and the four pressure reducing valve recesses 467f, 467r are arranged along the respective straight lines B and C, only one pressure increasing passage 520 and only one pressure reducing passage 522 are sufficient for the pressure increasing and pressure reducing control valves 378, 380. Accordingly, the number of the required fluid passages can be reduced, making it possible to reduce the cost of manufacture of the hydraulic braking pressure control unit 316. Further, the high pressure passage 510 and the two master cylinder passages 500, 501 are formed so as to extend respective spacings between the adjacent two pressure increasing control valves 466f, 466r, the required X-axis dimension of the holder block 420 can be reduced.

Further, the pressure increasing passage 520 is connected at an intermediate portion thereof to the high pressure passage 510, so that the pressurized fluid delivered from the pump device 344 can be utilized equally for the front wheel brake cylinders 320, 321 and the rear wheel brake cylinders 322, 323, leading to even distribution of the pressurized fluid. It is noted in particular that the high pressure passage 510 formed along the bisector line A is effective to reduce deterioration of accuracy of control of the wheel brake cylinder pressures being increased.

It is also noted that the master cylinder passages 500, 501 and the high pressure passage 510 are formed independently of each other. In addition, the brake cylinder passages 502a, 504a are provided commonly for the dynamic system (for operating brakes 418 with the pressurized fluid delivered from the power operated hydraulic pressure source 314) and the static system (for operating the brakes 418 with the pressurized fluid delivered from the master cylinder 312), while most of the other passages are provided for each of the dynamic and static systems. Further, the wheel brake cylinders 320-323 can be isolated from the power operated hydraulic pressure source 314 independently of each other, by the respective pressure increasing control valves 378 connected to the respective pressure increasing brake cylinder passages 502a-505a. This arrangement permits the brakes 418 to be operated by the static system, even in the event of a failure of the dynamic system. In the event of occurrence of any abnormality such as a fluid leakage in one of the dynamic and static systems, the other system can be operated. Since the master cylinder passages 500, 501 (static system) and the high pressure passage 510 (dynamic system) are formed close to each other, an arrangement for selective operation of the dynamic and static systems can be made simple. That is, the number of the required components for the selective operation can be reduced.

On the other hand, the holder block 420 has the connecting passage 358 for connecting the two brake cylinder passages 502, 503 for the front wheel brake cylinders 320, 321, and the connecting passage 360 for connecting the two brake cylinder passages 504, 505 for the rear wheel brake cylinders 322, 323, such that those connecting passages 358, 360 extend in the X-axis direction.

Figure 17:
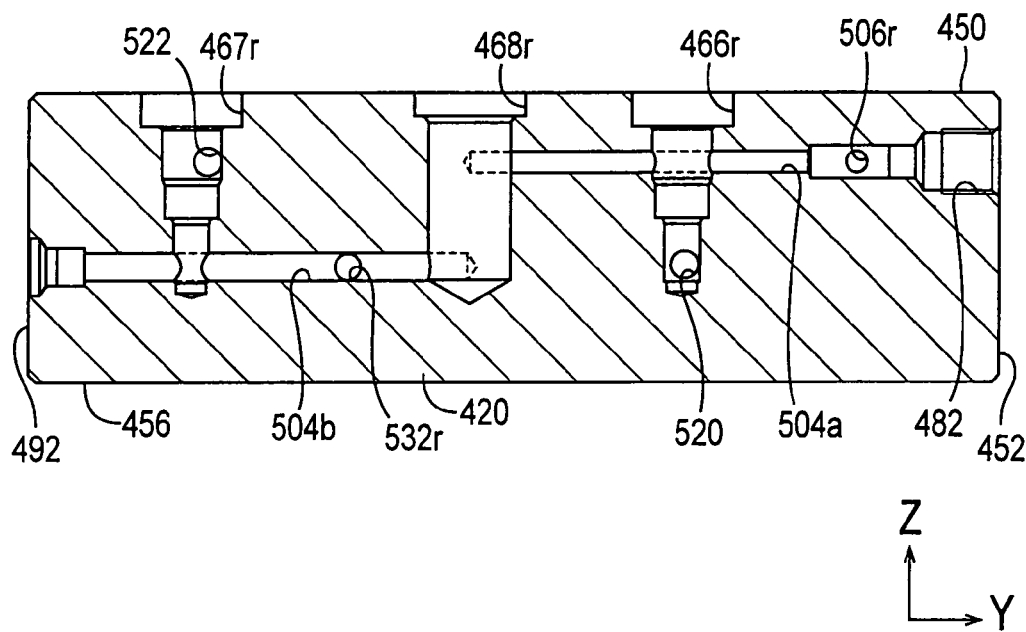
FIG. 17 is a cross sectional view of the hydraulic braking pressure control unit taken along line 17-17 of FIG. 16.
Figure 18:
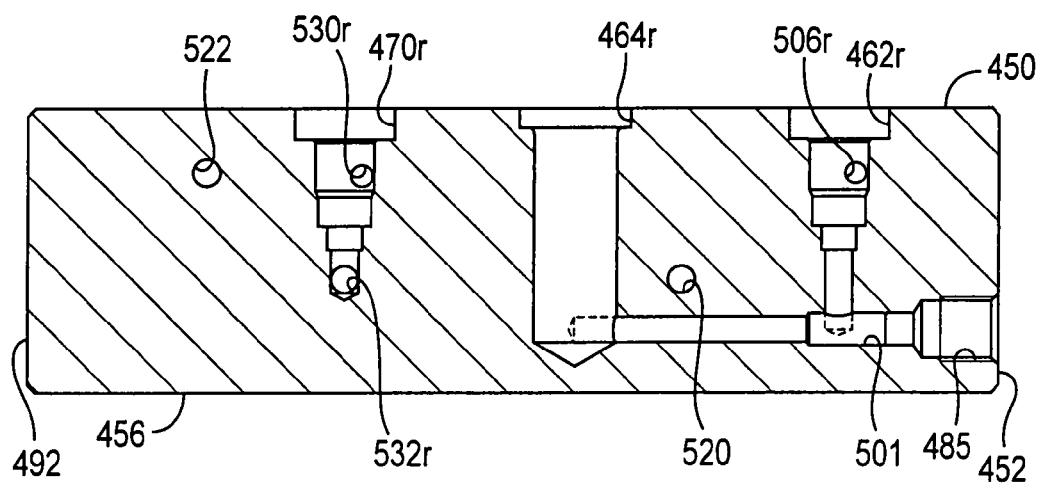
FIG. 18 is a cross sectional view of the pressure control unit taken along line 18-18 of FIG. 16.
Figure 19:
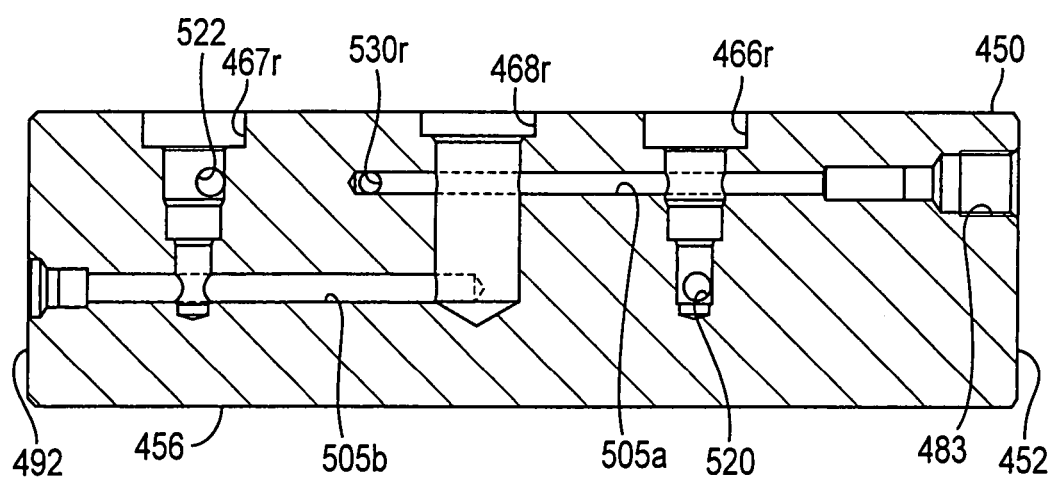
FIG. 19 is a cross sectional view of the pressure control unit taken along line 19-19 of FIG. 16.

Described more specifically, the rear wheel-cylinder connecting passage 360 includes a first communication passage 530r and a second communication passage 532r. As shown in FIGS. 17-19, these first and second communication passages 530r, 532r are connected to each other through the communication-valve recess 470r. The first communication passage 530r is formed in communication with an intermediate port of the communication control valve 364 attached at the communication valve recess 4704, and with the pressure increasing brake cylinder passage 505a. The second communication passage 532r is formed in communication with an inner port of the communication control valve 364 and with the pressure reducing brake cylinder passage 504b. Similarly, the front wheel-cylinder communication passage 348 includes a first communication passage 530f and a second communication passage 532f for connecting the two brake cylinder passages 502, 503.

The various hydraulic pressure control components described above are attached to the holder block 420 constructed as described above, as shown in FIG. 21. The positional relationships among the hydraulic components are the same as those among the corresponding mounting recesses, as indicated previously. The master cylinder cut-off valves 412, 414 and other valves as shown in FIG. 21 have not been provided with the solenoid coils. After those valves are provided with the solenoid coils, the projecting portions of the valves and pressure sensors are enclosed in a housing 540 placed on the first surface 450 of the holder block 420, as shown in FIG. 20. The power supply wires and signal wire extend out of the housing 540 into the ox 448 in which the lead wires are connected to the appropriate battery and the ECU 440 through suitable connecting or wiring members. Since all of the hydraulic pressure control components are attached to the first surface 450 of the holder block 420, the lead wires can be easily bundled together.

In the illustrated embodiments, the pressure increasing and pressure reducing control valves 84, 86, 378, 380 are linear control valves capable of continuously controlling a fluid pressure difference on their opposite sides, by controlling an amount of electric current applied to their coil. However, these linear control valves may be replaced by solenoid-operated shut-off valves which are opened and closed by energization and deenergization of their coil. In this case, the fluid pressure in each wheel brake cylinder can be controlled by controlling the duty ratio of the corresponding shut-off valve, for example. While the four sets of pressure increasing and pressure reducing control valves 84, 86, 378, 380 are provided for the respective four wheel brake cylinders 22, 24, 320-323, a single control valve may be provided commonly for two or three of the four wheel brake cylinders, or for all of the four wheel brake cylinders.

The holder block 420 may be modified to hold other hydraulic components such as components of the power operated hydraulic pressure source 314 (e.g., pump 340, pump motor 342, accumulator 346), components of the stroke simulator device 430, pressure relief valve 352, and reservoir 350. Further, it is not essential to provide the four brake cylinder pressure sensors 122, 386, 388 for the respective four wheel brake cylinders, since the fluid pressures in all of the wheel brake cylinders are usually equal to each other during a normal operation of the braking system. While the master cylinder 312 used in the second embodiment is provided with the hydraulic booster, this mater cylinder 312 may be replaced by an ordinary master cylinder of tandem type, like the master cylinder 20 used in the first embodiment. The accumulator pressure sensors 62, 348 may be replaced by an accumulator pressure switch.

In the second embodiment, it is not essential to provide the connecting passages 358, 360 and the communication control valves 362, 364. The principle of the present invention is equally applicable to a hydraulic braking pressure control unit arranged for use in a braking system having five or more brake cylinders. In the second embodiment, the holder block 420 is attached to the vehicle body at the fourth surface 456, the holder block 420 may be attached to the vehicle body, at its fifth surface 490 or sixth surface 492 which does not have any connector ports. Further, the holder block 420 may be attached to the vehicle body at the selected two or more surfaces. The principle of the present invention is applicable to a braking system of so-called "diagonal" or "X-crossing" type.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A hydraulic braking pressure control unit comprising:
a plurality of electromagnetically operated hydraulic pressure control valves capable of controlling pressure of a working fluid in a plurality of brake cylinders;
a power-operated hydraulic pressure source power-operable to pressurize the working fluid, and including a pump device having a pump operable to pressurize the working fluid received from a low-pressure source and deliver the pressurized working fluid, and an accumulator for storing the pressurized working fluid delivered from the pump device;
a master-cylinder pressure sensor operable to detect a pressure of the working fluid pressurized by a master cylinder;
an accumulator pressure sensor operable to detect a pressure of the working fluid stored in said accumulator;
and a holder structure which holds said plurality of electromagnetically operated hydraulic pressure control valves,
wherein said plurality of electromagnetically hydraulic pressure control valves include four control valves having respective main body portions which are arranged along a straight line on one surface of said holder structure and which are four pressure-increasing control valves connected to said power-operated hydraulic pressure source and to the respective four brake cylinders or four pressure-reducing control valves connected to said low-pressure source and to said respective four brake cylinders, and said holder structure has a delivery passage which is connected to said power-operated hydraulic pressure source and through which the pressurized working fluid is delivered from said pump device, and at least one master-cylinder passage connected to the master cylinder manually operable to pressurize the working fluid, each of said pressure-source passage and said at least one master-cylinder passage being formed in said holder structure, so as to extend in a direction intersecting said straight line, between two adjacent ones of said plurality of control valves, as seen in a plane of said one surface,
and further wherein said holder structure holds all of said plurality of electromagnetically operated hydraulic pressure control valves, said master-cylinder pressure sensor and said accumulator pressure sensor such that the main body portions of the electromagnetically operated hydraulic pressure control valves, master-cylinder pressure sensor and accumulator pressure sensor are attached to said one surface.

2. The hydraulic braking pressure control unit according to claim 1, wherein said at least one master-cylinder passage consists of two master-cylinder passages each of which is formed so as to extend between two adjacent ones of said plurality of control valves, as seen in said plane.

3. A hydraulic braking pressure control unit comprising:
a power-operated hydraulic pressure source including a pump device having a pump operable to pressurize a working fluid received from a low-pressure source and deliver the pressurized working fluid, and an accumulator for storing the pressurized working fluid delivered from the pump device;
a plurality of electromagnetically operated hydraulic pressure control valves capable of controlling pressures of the working fluid in respective brake cylinders, said plurality of electromagnetically operated hydraulic pressure control valves including a group of respective pressure-increasing control valves connected to said power-operated hydraulic pressure source and to the respective brake cylinders, and a group of pressure-reducing control valves connected to said low-pressure source and to said respective brake cylinders;
a master-cylinder pressure sensor operable to detect a pressure of the working fluid pressurized by a master cylinder operable by an operator to pressurize the working fluid;
an accumulator pressure sensor operable to detect a pressure of the working fluid stored in said accumulator; and
a holder structure which holds said plurality of electromagnetically operated hydraulic pressure control valves such that main body portions of said plurality of electromagnetically operated hydraulic pressure control valves are arranged on one surface of said holder structure, said plurality of electromagnetically operated hydraulic control valves including a plurality of control valves the main body portions of which are arranged along a straight line,
wherein said holder structure having at least one fluid passage which is formed in said holder structure such that each of said at least one fluid passage extends in a direction intersecting said straight line, between two adjacent ones of said plurality of control valves as seen in a plane of said one surface, said at least one fluid passage including a delivery passage through which said pressurized working fluid is delivered from said pump device,
and wherein said holder structure holds all of said plurality of electromagnetically operated hydraulic pressure control valves, said master cylinder pressure sensor and said accumulator pressure sensor such that the main body portions of the electromagnetically operated hydraulic pressure control valves, master cylinder pressure sensor and accumulator pressure sensor are attached to said one surface.

4. A hydraulic braking control unit used for a braking system including a plurality of brake cylinders, a master cylinder manually operable to pressurize a working fluid, and a power-operated hydraulic pressure source including a pump device having a pump operable to pressurize the working fluid, and an accumulator for storing the working fluid pressurized by the pump, said hydraulic braking control unit comprising:
a plurality of hydraulic control valves capable of controlling pressure of the working fluid in said plurality of brake cylinders;
at least one master-cylinder pressure sensor operable to detect a pressure of the working fluid pressurized by said master cylinder;
an accumulator pressure sensor operable to detect a pressure of the working fluid stored in said accumulator; and
a holder structure which has at least one master-cylinder passage connecting said master cylinder to said at least one master-cylinder pressure sensor, and a pressure-source passage connecting said accumulator to said accumulator pressure sensor,
and wherein said holder structure holds said plurality of hydraulic pressure control valves, said at least one master-cylinder pressure sensor and said accumulator pressure sensor such that the main body portions of the hydraulic pressure control valves, and main body portions of the at least one master-cylinder pressure sensor and accumulator pressure sensor are attached to one surface of the holder structure, said pressure-source passage being formed in said holder structure, so as to extend between two adjacent ones of said plurality of hydraulic control valves, as seen in a plane of said one surface.

5. A hydraulic braking pressure control unit according to claim 4, wherein each of said at least one master cylinder passage is formed in said holder structure, so as to extend between two adjacent ones of said plurality of hydraulic pressure control valves, as seen in a plane of said one surface.

* * * * *